United States Patent
Kossovsky

(10) Patent No.: US 9,058,285 B2
(45) Date of Patent: Jun. 16, 2015

(54) METHOD AND SYSTEM FOR FORENSIC DATA ANALYSIS IN FRAUD DETECTION EMPLOYING A DIGITAL PATTERN MORE PREVALENT THAN BENFORD'S LAW

(76) Inventor: Alex Ely Kossovsky, New York City, NY (US)

( * ) Notice: Subject to any disclaimer, the term of this patent is extended or adjusted under 35 U.S.C. 154(b) by 236 days.

(21) Appl. No.: 13/535,269

(22) Filed: Jun. 27, 2012

(65) Prior Publication Data
US 2014/0006468 A1   Jan. 2, 2014

(51) Int. Cl.
| | | |
|---|---|---|
| G06F 17/00 | (2006.01) | |
| G06F 17/18 | (2006.01) | |
| G06Q 20/40 | (2012.01) | |
| G06F 17/10 | (2006.01) | |
| G06Q 40/00 | (2012.01) | |
| G06K 9/00 | (2006.01) | |

(52) U.S. Cl.
CPC ............ *G06F 17/10* (2013.01); *G06Q 20/4016* (2013.01); *G06F 17/18* (2013.01); *G06Q 40/00* (2013.01); *G06K 9/00885* (2013.01)

(58) Field of Classification Search
CPC .................................. G06F 17/10; G06F 17/18
See application file for complete search history.

(56) References Cited

U.S. PATENT DOCUMENTS

| | | |
|---|---|---|
| 7,590,658 B2 | 9/2009 | Bahl et al. |
| 7,937,321 B2 | 5/2011 | Hoefelmeyer |
| 7,940,989 B2 | 5/2011 | Shi et al. |
| 8,175,844 B2 | 5/2012 | Nobuyoshi et al. |
| 2010/0205076 A1* | 8/2010 | Parson et al. ............. 705/30 |

OTHER PUBLICATIONS

Alex E. Kossovsky: "Towards a Better Understanding of the Leading Digits Phenomena (Benford's Law)", Article, 2012, Cornell University Library, http://arxiv.org/abs/math/0612627.
Mark J. Nigrini: "I've Got Your Number", Article, May 1999, Journal of Accountancy, Article.
Mark J. Nigrini: "Benford's Law—Applications for Forensic Accounting, Auditing, and Fraud Detection", Book, Apr. 2012, Wiley Publishing.
Cindy Durtschi: "The Effective Use of Benford's Law to Assist in Detecting Fraud in Accounting Data", Article, Jul. 2003, DOA Utah State Pb.

* cited by examiner

*Primary Examiner* — Chuong D Ngo

(57) ABSTRACT

A computerized system for a digital method for the detection of fraud and/or anomalous transactions is disclosed based on a novel statistical interpretation of Benford's Law and a unique set of computer implementations outlining the development of digital distributions from the low-value region on the left of a given data set to the high-value region on the right. A division into sub-intervals of the entire data set along adjacent integral powers of ten suggested in the method provides the unique manner of visualizing and computer output actualization of the gradual evolution of digital distribution from near digital equality on the left to severe inequality on the right. The method provides a venue for detecting fraud committed by the sophisticated cheater well-aware of Benford's Law but inventing data without regards to development. Experimental results consistently demonstrate the effectiveness of the techniques used in embodiments of the invention.

16 Claims, 17 Drawing Sheets

FIG 5:

| | CENSUS DATA - COUNTY AREA | | | | | |
|---|---|---|---|---|---|---|
| | INTEGRAL POWERS OF TEN PARTITION (1, 10) | | | | | |
| Sub Interval Index | 1 | 2 | 3 | 4 | 5 | 6 |
| S.I. Left Border | 1 | 10 | 100 | 1,000 | 10,000 | 100,000 |
| S.I. Right Border | 10 | 100 | 1,000 | 10,000 | 100,000 | 1,000,000 |
| | | | | | | |
| Digit 1 | 0.0% | 29.3% | 3.8% | 59.8% | 59.1% | 100.0% |
| Digit 2 | 18.8% | 9.8% | 7.8% | 17.6% | 22.7% | 0.0% |
| Digit 3 | 0.0% | 4.9% | 11.5% | 8.2% | 9.1% | 0.0% |
| Digit 4 | 0.0% | 17.1% | 18.6% | 6.3% | 4.5% | 0.0% |
| Digit 5 | 6.3% | 12.2% | 18.9% | 2.7% | 0.0% | 0.0% |
| Digit 6 | 25.0% | 7.3% | 12.6% | 2.4% | 0.0% | 0.0% |
| Digit 7 | 12.5% | 2.4% | 10.7% | 1.2% | 0.0% | 0.0% |
| Digit 8 | 12.5% | 14.6% | 8.7% | 0.8% | 4.5% | 0.0% |
| Digit 9 | 25.0% | 2.4% | 7.3% | 0.9% | 0.0% | 0.0% |
| | | | | | | |
| # of values in S.I. | 16 | 41 | 2408 | 655 | 22 | 1 |
| S.I. % of Overall Data | 0.5% | 1.3% | 76.6% | 20.8% | 0.7% | 0.03% |
| | | | | | | |
| =(A1-0.301)/0.301 | -1.00 | -0.03 | -0.87 | 0.99 | 0.96 | 2.32 |
| =(A2-0.176)/0.176 | 0.07 | -0.45 | -0.56 | 0.00 | 0.29 | -1.00 |
| =(0.067-A6)/0.067 | -2.73 | -0.09 | -0.88 | 0.64 | 1.00 | 1.00 |
| =(0.058-A7)/0.058 | -1.16 | 0.58 | -0.85 | 0.79 | 1.00 | 1.00 |
| =(0.051-A8)/0.051 | -1.45 | -1.87 | -0.71 | 0.85 | 0.11 | 1.00 |
| =(0.046-A9)/0.046 | -4.43 | 0.47 | -0.59 | 0.80 | 1.00 | 1.00 |
| | | | | | | |
| DS of Sub-Interval | -10.7 | -1.4 | -4.5 | 4.1 | 4.4 | 5.3 |

FIG 7:

| | CENSUS DATA - COUNTY AREA INCORRECT PARTITION METHOD (2, 20) | | | | |
|---|---|---|---|---|---|
| Sub Interval Index | 1 | 2 | 3 | 4 | 5 |
| S.I. Left Border | 2 | 20 | 200 | 2,000 | 20,000 |
| S.I. Right Border | 20 | 200 | 2,000 | 20,000 | 200,000 |
| | | | | | |
| Digit 1 | 42.9% | 76.0% | 14.5% | 4.7% | 10.0% |
| Digit 2 | 10.7% | 3.3% | 6.9% | 41.7% | 50.0% |
| Digit 3 | 0.0% | 1.7% | 10.2% | 19.6% | 20.0% |
| Digit 4 | 0.0% | 5.8% | 16.6% | 14.9% | 10.0% |
| Digit 5 | 3.6% | 4.1% | 16.8% | 6.5% | 0.0% |
| Digit 6 | 14.3% | 2.5% | 11.2% | 5.8% | 0.0% |
| Digit 7 | 7.1% | 0.8% | 9.5% | 2.9% | 0.0% |
| Digit 8 | 7.1% | 5.0% | 7.8% | 1.8% | 10.0% |
| Digit 9 | 14.3% | 0.8% | 6.5% | 2.2% | 0.0% |
| | | | | | |
| # of values in S.I. | 28 | 121 | 2708 | 276 | 10 |
| S.I. % of Overall Data | 0.9% | 3.8% | 86.2% | 8.8% | 0.3% |
| =(A1-0.301)/0.301 | 0.42 | 1.53 | -0.52 | -0.84 | -0.67 |
| =(A2-0.176)/0.176 | -0.39 | -0.81 | -0.61 | 1.37 | 1.84 |
| =(0.067-A6)/0.067 | -1.13 | 0.63 | -0.68 | 0.13 | 1.00 |
| =(0.058-A7)/0.058 | -0.23 | 0.86 | -0.64 | 0.50 | 1.00 |
| =(0.051-A8)/0.051 | -0.40 | 0.03 | -0.52 | 0.64 | -0.96 |
| =(0.046-A9)/0.046 | -2.11 | 0.82 | -0.41 | 0.53 | 1.00 |
| | | | | | |
| DS of Sub-Interval | -3.8 | 3.0 | -3.4 | 2.3 | 3.2 |

FIG 8:

| | CENSUS DATA - COUNTY AREA INCORRECT PARTITION METHOD (0.615, 6.15) | | | | | |
|---|---|---|---|---|---|---|
| Sub Interval Index | 1 | 2 | 3 | 4 | 5 | 6 |
| S.I. Left Border | 0.61563 | 6.1563 | 61.563 | 615.63 | 6156.3 | 61,563 |
| S.I. Right Border | 6.1563 | 61.563 | 615.63 | 6156.3 | 61,563 | 615,630 |
| | | | | | | |
| Digit 1 | 0.0% | 27.9% | 6.0% | 25.9% | 24.1% | 50.0% |
| Digit 2 | 75.0% | 9.3% | 12.3% | 7.6% | 9.3% | 0.0% |
| Digit 3 | 0.0% | 4.7% | 18.2% | 3.6% | 3.7% | 0.0% |
| Digit 4 | 0.0% | 16.3% | 29.5% | 2.7% | 1.9% | 0.0% |
| Digit 5 | 25.0% | 11.6% | 29.8% | 1.2% | 0.0% | 0.0% |
| Digit 6 | 0.0% | 11.6% | 3.7% | 16.6% | 25.9% | 0.0% |
| Digit 7 | 0.0% | 4.7% | 0.1% | 17.0% | 14.8% | 0.0% |
| Digit 8 | 0.0% | 4.7% | 0.4% | 13.9% | 9.3% | 50.0% |
| Digit 9 | 0.0% | 9.3% | 0.1% | 11.6% | 11.1% | 0.0% |
| | | | | | | |
| # of values in S.I. | 4 | 43 | 1524 | 1516 | 54 | 2 |
| S.I. % of Overall Data | 0.1% | 1.4% | 48.5% | 48.2% | 1.7% | 0.06% |
| =(A1-0.301)/0.301 | -1.00 | -0.07 | -0.80 | -0.14 | -0.20 | 0.66 |
| =(A2-0.176)/0.176 | 3.26 | -0.47 | -0.30 | -0.57 | -0.47 | -1.00 |
| =(0.067-A6)/0.067 | 1.00 | -0.74 | 0.45 | -1.48 | -2.87 | 1.00 |
| =(0.058-A7)/0.058 | 1.00 | 0.20 | 0.99 | -1.93 | -1.55 | 1.00 |
| =(0.051-A8)/0.051 | 1.00 | 0.09 | 0.92 | -1.72 | -0.82 | -8.80 |
| =(0.046-A9)/0.046 | 1.00 | -1.02 | 0.99 | -1.52 | -1.42 | 1.00 |
| | | | | | | |
| DS of Sub-Interval | 6.3 | -2.0 | 2.3 | -7.4 | -7.3 | -6.1 |

FIG 9:

| | CENSUS DATA - COUNTY AREA INCORRECT PARTITION METHOD (0.8, 8) | | | | | |
|---|---|---|---|---|---|---|
| Sub Interval Index | 1 | 2 | 3 | 4 | 5 | 6 |
| S.I. Left Border | 0.8 | 8 | 80 | 800 | 8,000 | 80,000 |
| S.I. Right Border | 8 | 80 | 800 | 8,000 | 80,000 | 800,000 |
| | | | | | | |
| Digit 1 | 0.0% | 30.0% | 4.5% | 38.1% | 40.6% | 50.0% |
| Digit 2 | 30.0% | 10.0% | 9.3% | 11.2% | 15.6% | 0.0% |
| Digit 3 | 0.0% | 5.0% | 13.7% | 5.2% | 6.3% | 0.0% |
| Digit 4 | 0.0% | 17.5% | 22.1% | 4.0% | 3.1% | 0.0% |
| Digit 5 | 10.0% | 12.5% | 22.4% | 1.7% | 0.0% | 0.0% |
| Digit 6 | 40.0% | 7.5% | 15.0% | 1.6% | 0.0% | 0.0% |
| Digit 7 | 20.0% | 2.5% | 12.7% | 0.8% | 0.0% | 0.0% |
| Digit 8 | 0.0% | 5.0% | 0.3% | 20.4% | 15.6% | 50.0% |
| Digit 9 | 0.0% | 10.0% | 0.0% | 17.1% | 18.8% | 0.0% |
| | | | | | | |
| # of values in S.I. | 10 | 40 | 2029 | 1030 | 32 | 2 |
| S.I. % of Overall Data | 0.3% | 1.3% | 64.6% | 32.8% | 1.0% | 0.06% |
| | | | | | | |
| =(A1-0.301)/0.301 | -1.00 | 0.00 | -0.85 | 0.26 | 0.35 | 0.66 |
| =(A2-0.176)/0.176 | 0.70 | -0.43 | -0.47 | -0.37 | -0.11 | -1.00 |
| =(0.067-A6)/0.067 | -4.97 | -0.12 | -1.24 | 0.77 | 1.00 | 1.00 |
| =(0.058-A7)/0.058 | -2.45 | 0.57 | -1.19 | 0.87 | 1.00 | 1.00 |
| =(0.051-A8)/0.051 | 1.00 | 0.02 | 0.94 | -3.00 | -2.06 | -8.80 |
| =(0.046-A9)/0.046 | 1.00 | -1.17 | 0.99 | -2.71 | -3.08 | 1.00 |
| | | | | | | |
| DS of Sub-Interval | -5.7 | -1.1 | -1.8 | -4.2 | -2.9 | -6.1 |

FIG 10:

| PAYROLL DATA | | | | |
|---|---|---|---|---|
| INTEGRAL POWERS OF TEN PARTITION (1, 10) | | | | |
| Sub Interval Index | 1 | 2 | 3 | 4 |
| S.I. Left Border | 1 | 10 | 100 | 1,000 |
| S.I. Right Border | 10 | 100 | 1,000 | 10,000 |
| | | | | |
| Digit 1 | 10.5% | 5.4% | 13.9% | 100.0% |
| Digit 2 | 0.0% | 13.1% | 23.0% | 0.0% |
| Digit 3 | 10.5% | 9.0% | 23.8% | 0.0% |
| Digit 4 | 10.5% | 12.7% | 20.4% | 0.0% |
| Digit 5 | 10.5% | 9.7% | 9.4% | 0.0% |
| Digit 6 | 21.1% | 10.0% | 4.8% | 0.0% |
| Digit 7 | 10.5% | 13.0% | 2.3% | 0.0% |
| Digit 8 | 0.0% | 13.0% | 1.6% | 0.0% |
| Digit 9 | 26.3% | 14.2% | 0.8% | 0.0% |
| | | | | |
| # of values in S.I. | 19 | 802 | 8985 | 72 |
| S.I. % of Overall Data | 0.2% | 8.1% | 91.0% | 0.7% |
| | | | | |
| =(A1-0.301)/0.301 | -0.65 | -0.82 | -0.54 | 2.32 |
| =(A2-0.176)/0.176 | -1.00 | -0.26 | 0.31 | -1.00 |
| =(0.067-A6)/0.067 | -2.14 | -0.49 | 0.28 | 1.00 |
| =(0.058-A7)/0.058 | -0.81 | -1.24 | 0.60 | 1.00 |
| =(0.051-A8)/0.051 | 1.00 | -1.54 | 0.68 | 1.00 |
| =(0.046-A9)/0.046 | -4.72 | -2.09 | 0.82 | 1.00 |
| | ------ | ------ | ------ | ------ |
| DS of Sub-Interval | -8.3 | -6.4 | 2.1 | 5.3 |

FIG 12:

| CATALOG DATA - EVENT-LINE | | | | | | | |
|---|---|---|---|---|---|---|---|
| INTEGRAL POWERS OF TEN PARTITION (1, 10) | | | | | | | |
| Sub Interval Index | 1 | 2 | 3 | 4 | 5 | 6 | 7 |
| S.I. Left Border | 0.01 | 0.1 | 1 | 10 | 100 | 1,000 | 10,000 |
| S.I. Right Border | 0.1 | 1 | 10 | 100 | 1,000 | 10,000 | 100,000 |
| | | | | | | | |
| Digit 1 | 0.0% | 0.0% | 13.6% | 17.0% | 34.0% | 59.2% | 100.0% |
| Digit 2 | 0.0% | 0.0% | 15.7% | 15.1% | 23.8% | 12.2% | 0.0% |
| Digit 3 | 0.0% | 0.0% | 12.1% | 10.7% | 16.0% | 14.3% | 0.0% |
| Digit 4 | 0.0% | 7.7% | 7.9% | 13.8% | 8.8% | 2.0% | 0.0% |
| Digit 5 | 0.0% | 23.1% | 13.6% | 10.5% | 4.6% | 8.2% | 0.0% |
| Digit 6 | 100.0% | 30.8% | 10.0% | 12.6% | 4.9% | 2.0% | 0.0% |
| Digit 7 | 0.0% | 23.1% | 5.0% | 8.4% | 5.1% | 0.0% | 0.0% |
| Digit 8 | 0.0% | 7.7% | 12.9% | 6.3% | 1.8% | 2.0% | 0.0% |
| Digit 9 | 0.0% | 7.7% | 9.3% | 5.6% | 1.1% | 0.0% | 0.0% |
| | | | | | | | |
| # of values in S.I. | 1 | 13 | 140 | 783 | 844 | 49 | 1 |
| S.I. % of Overall Data | 0.05% | 0.7% | 7.6% | 42.8% | 46.1% | 2.7% | 0.05% |
| | | | | | | | |
| =(A1-0.301)/0.301 | -1.00 | -1.00 | -0.55 | -0.44 | 0.13 | 0.97 | 2.32 |
| =(A2-0.176)/0.176 | -1.00 | -1.00 | -0.11 | -0.14 | 0.35 | -0.30 | -1.00 |
| =(0.067-A6)/0.067 | -13.93 | -3.59 | -0.49 | -0.89 | 0.27 | 0.70 | 1.00 |
| =(0.058-A7)/0.058 | 1.00 | -2.98 | 0.14 | -0.45 | 0.12 | 1.00 | 1.00 |
| =(0.051-A8)/0.051 | 1.00 | -0.51 | -1.52 | -0.23 | 0.65 | 0.60 | 1.00 |
| =(0.046-A9)/0.046 | 1.00 | -0.67 | -1.02 | -0.22 | 0.77 | 1.00 | 1.00 |
| | ----- | ----- | ----- | ----- | ----- | ----- | ----- |
| DS of Sub-Interval | -12.9 | -9.8 | -3.6 | -2.4 | 2.3 | 4.0 | 5.3 |

FIG 14:

EVENT-LINE CATALOG
2nd ORDER LEADING DIGITS DEVELOPMENT

| Sub Interval Index | 2 | 3 | 4 | 5 | 6 |
|---|---|---|---|---|---|
| S.I. Left Border | 0.1 | 1 | 10 | 100 | 1,000 |
| S.I. Right Border | 1 | 10 | 100 | 1,000 | 10,000 |
| | | | | | |
| Digit 0 | 0.0% | 12.1% | 10.3% | 11.6% | 20.4% |
| Digit 1 | 0.0% | 14.3% | 9.8% | 11.3% | 8.2% |
| Digit 2 | 30.8% | 12.1% | 10.3% | 10.0% | 12.2% |
| Digit 3 | 7.7% | 5.7% | 11.9% | 9.7% | 12.2% |
| Digit 4 | 0.0% | 9.3% | 7.9% | 8.4% | 10.2% |
| Digit 5 | 7.7% | 10.0% | 10.7% | 6.3% | 4.1% |
| Digit 6 | 7.7% | 7.1% | 9.3% | 12.8% | 10.2% |
| Digit 7 | 30.8% | 10.0% | 8.0% | 14.3% | 6.1% |
| Digit 8 | 7.7% | 6.4% | 9.1% | 7.0% | 10.2% |
| Digit 9 | 7.7% | 12.9% | 12.5% | 8.8% | 6.1% |
| | | | | | |
| # of values in S.I. | 13 | 140 | 783 | 844 | 49 |
| S.I. % of Overall Data | 0.7% | 7.6% | 42.8% | 46.1% | 2.68% |
| | | | | | |
| =(A0 - 0.12)/0.12 | -1.00 | 0.01 | -0.14 | -0.04 | 0.70 |
| =(A1 - 0.114)/0.114 | -1.00 | 0.25 | -0.14 | -0.01 | -0.28 |
| =(A2 - 0.109)/0.109 | 1.82 | 0.11 | -0.05 | -0.08 | 0.12 |
| =(0.09 - A7)/0.09 | -2.42 | -0.11 | 0.11 | -0.59 | 0.32 |
| =(0.088 - A8)/0.088 | 0.13 | 0.27 | -0.03 | 0.21 | -0.16 |
| =(0.085 - A9)/0.085 | 0.10 | -0.51 | -0.47 | -0.03 | 0.28 |
| | | | | | |
| DS2 of Sub-Interval | -2.4 | 0.0 | -0.7 | -0.6 | 1.0 |

FIG 17:

| | EXPONENTIAL GROWTH SERIES $10 GROWING AT 3% PER YEAR FOR 468 YEARS | | | | | |
|---|---|---|---|---|---|---|
| Sub Interval Index | 1 | 2 | 3 | 4 | 5 | 6 |
| S.I. Left Border | 10 | 100 | 1,000 | 10,000 | 100,000 | 1,000,000 |
| S.I. Right Border | 100 | 1,000 | 10,000 | 100,000 | 1,000,000 | 10,000,000 |
| Digit 1 | 30.8% | 30.8% | 30.8% | 30.8% | 30.8% | 29.5% |
| Digit 2 | 17.9% | 17.9% | 16.7% | 16.7% | 16.7% | 17.9% |
| Digit 3 | 11.5% | 11.5% | 12.8% | 12.8% | 12.8% | 12.8% |
| Digit 4 | 10.3% | 10.3% | 10.3% | 10.3% | 10.3% | 9.0% |
| Digit 5 | 7.7% | 7.7% | 7.7% | 7.7% | 7.7% | 9.0% |
| Digit 6 | 6.4% | 6.4% | 6.4% | 6.4% | 6.4% | 6.4% |
| Digit 7 | 6.4% | 6.4% | 6.4% | 6.4% | 5.1% | 5.1% |
| Digit 8 | 5.1% | 5.1% | 5.1% | 5.1% | 5.1% | 5.1% |
| Digit 9 | 3.8% | 3.8% | 3.8% | 3.8% | 5.1% | 5.1% |
| # of values in S.I. | 78 | 78 | 78 | 78 | 78 | 78 |
| S.I. % of Overall Data | 16.7% | 16.7% | 16.7% | 16.7% | 16.7% | 16.7% |
| =(A1-0.301)/0.301 | 0.02 | 0.02 | 0.02 | 0.02 | 0.02 | -0.02 |
| =(A2-0.176)/0.176 | 0.02 | 0.02 | -0.05 | -0.05 | -0.05 | 0.02 |
| =(0.067-A6)/0.067 | 0.04 | 0.04 | 0.04 | 0.04 | 0.04 | 0.04 |
| =(0.058-A7)/0.058 | -0.11 | -0.11 | -0.11 | -0.11 | 0.12 | 0.12 |
| =(0.051-A8)/0.051 | -0.01 | -0.01 | -0.01 | -0.01 | -0.01 | -0.01 |
| =(0.046-A9)/0.046 | 0.16 | 0.16 | 0.16 | 0.16 | -0.11 | -0.11 |
| DS of Sub-Interval | 0.1 | 0.1 | 0.1 | 0.1 | 0.0 | 0.0 |

METHOD AND SYSTEM FOR FORENSIC DATA ANALYSIS IN FRAUD DETECTION EMPLOYING A DIGITAL PATTERN MORE PREVALENT THAN BENFORD'S LAW

FIELD OF THE INVENTION

This invention relates to a new computerized method of forensic data analysis for the purpose of detecting fraudulent data. More specifically, it relates to a method for determining fake or invented data by utilizing special digital patterns derived from a closer scrutiny and better understanding of Benford's Law.

BACKGROUND OF THE INVENTION

Forensic data analysts, auditors, accountants, and financial analysts often use the predictability of digit occurrence in recorded amounts relating to accounting, financial, and investments reports as a tool to detect suspicious data.

One well-known existing method for detecting fraud and anomalies in a set of data is based on Benford's Law, which will be at times referred to by its abbreviation as BL. Frank Benford in "The law of anomalous numbers," Proceedings of the American Philosophical Society (1938), noted a peculiar proportion of digits in everyday data.

Benford's Law describes the overall proportion and the specific manner in which digits are expected to occur in a variety of real-life pieces of data. Leading Digits, abbreviated LD, or first significant digits, are the first digits of numbers appearing on the left. For 567.34 the leading digit is 5. For 0.0367 the leading digit is 3, as we discard the zeros. For the lone integer 6 the leading digit is 6. For negative numbers we simply discard the sign, hence for −34.68 the leading digit is 3. According to Benford's Law, the first leading digit is heavily skewed in favor of the low digits, where digit one ("1") occurs in about one-third of all recorded numbers, while the digit nine ("9") occurs less than one time in twenty. More specifically, for the first digit, the proportion of occurrences among all nine digits (beginning with digit 1) is: {30.1%, 17.6%, 12.5%, 9.7%, 7.9%, 6.7%, 5.8%, 5.1%, 4.6%}. See FIG. 1 for Benford's Law table of 1st digits distribution, as well as FIG. 2 for the chart.

The exact mathematical expression is Probability[1st digit is d]=$LOG_{10}(1+1/d)$, and this proportion among the first digits is also known in the literature as the logarithmic distribution or simply Benford. The validity of Benford's Law has been observed and verified in numerous domains. The formal mathematical explanation for this digital phenomenon has been demonstrated by Ted Hill in his seminal work "A statistical derivation of the significant-digit law," Statistical Science, 1995, showing that a collection or a mixture of a variety of distributions defined on the positive range is Benford in the limit. While the law is true for naturally occurring typical numbers related to financial, accounting, census, sports, and numerous others data, yet for maliciously invented fake data the law is obviously not obeyed and instead digits appear all equally likely (uniformly distributed), just as most people would mistakenly intuit. Mark Nigrini in the early 1990s first suggested applying this digital property as a technique in forensic data analysis of accounting and financial data to detect fraud, and further analysis is given in Nigrini, M J (1992). "The Detection of Income Tax Evasion Through an Analysis of Digital Frequencies". PhD thesis, University of Cincinnati, Ohio.

Following Nigrini's innovation soon afterwards, it has been increasing used by accounting firms, governmental tax authorities such as the IRS in the USA, and in most other tax authorities worldwide, as routine check on data. The logarithmic distribution is so ubiquitous that it is hard to overestimate its importance and relevance in forensic data analysis and other disciplines, and it is certainly found in almost all financial and accounting types of data. The term Leading Digits here would refer to the more general study of digital patterns for any piece of data and distribution whether they obey Benford's law or not. Clearly, there exist other digital patterns (mini laws) of lesser importance for some very particular pieces of data and distribution outside the scope of BL. It is important to recognize the fact that each well-defined piece of data or a distribution has its own particular leading digits signature, a sort of a hidden digital code—not immediately obvious during the first visual (preliminary) inspection of it when the focus is on numbers and quantities as oppose to their digital expressions.

Fraud and anomalies can be detected using Benford's law by comparing the actual distribution of the first digits in a set of accounting or financial data to the theoretical distribution given by Benford's law. A cautionary flag is raised if deviation of actual from theoretical is significant, which calls for further scrutiny and examination of data. The law also describes an exact distribution for the second order digits, where proportions among digits are more equal, culminating in near equality for the 5th and higher orders. For example, the 2nd leading digit (from the left) of 603 is digit 0, of 0.0002867 it's digit 8, and of 1,653,832 it's digit 6. It is noted that for the 2nd and higher orders, digit 0 is also included. The exact 2nd order distribution for all 10 digits according to Benford's Law is: {12.0%, 11.4%, 10.9%, 10.4%, 10.0%, 9.7%, 9.3%, 9.0%, 8.8%, 8.5%}. See FIG. 3 for a chart showing this more even distribution. Digital proportion for the 2nd order is not nearly as skewed in favor of low digits as is the case for the 1st order, hence even though further digital tests involving higher orders can also be performed, their power to detect fraud is much reduced as the random often overwhelms the systematic.

Yet, two serious pitfalls arise in this context. The first is whenever data itself is not inherently Benford to begin with and thus can not be so tested. Examples of such non-Benford data are Payroll amounts, amounts with built-in minimums or maximums, amounts with human-made restrictions or specific intentions, as well as others types of data. The second pitfall is whenever fake data is invented and provided by the sophisticated and well-educated cheater already aware of Benford's Law and all its higher orders features as well.

The latter difficulty is a factor that will become increasingly more problematic, and will represent a serious challenge to the forensic data analysis applying Benford's Law as more accountants and executives become aware of this digital phenomena and will be tempted to calibrate digits in invented fake data according to the law so as to make it appear genuine.

This invention is aimed at providing a satisfactory answer to both of these two pitfalls by providing the auditor and forensic data analyst an exact computerized venue for an alternative test by employing the invented techniques and algorithms relating to a digital pattern existing within the data selected for examination, a pattern more prevalent the Benford's Law and covering types of data hitherto not under the scope of the examining statistician/programmer. This newly discovered pattern showing more intricate and refined digital order within numbers and applied via the techniques and computer implementations presented herein would frustrate the more sophisticated and educated cheater carefully adjusting invented data to Benford's Law.

BRIEF SUMMARY OF THE INVENTION

The method described herein includes a processor-readable storage apparatus containing software code that, upon execution by a processor, causes the processor to implement operations relating to statistical and computerized software techniques for the detection of fraud and anomalous transactions for the two challenging cases mentioned above.

The basis of the method relies on some mathematical observation made by the inventor of the method herein in the field of Benford's Law. It is well-known that there are primarily two distinct processes leading to a Benford distribution, namely, the deterministic and the random. The related conjecture proposed in this context is that for deterministic multiplication processes (such as exponential growths and decays) the logarithmic distribution is steady, constant, and that it manifests itself equally throughout the entire range of data. In other words, for large enough such deterministic data, examining mini leading digits distribution on smaller sub-intervals reveal the same digital pattern throughout the entire range. The same conjecture also claims that for random and statistical processes, the logarithmic distribution shows consistent pattern of differentiation when examined on smaller sub-intervals comprising the entire range, where first digit distribution begins its evolution or development on the left-most part of the range (where values are low) by giving high digits such as 7, 8 or 9 some advantage. Slightly farther on to the right, but still far from the center of data where the median resides, digital equality is roughly observed. Around the central region, where typically the biggest portion of overall data lies, the logarithmic itself is roughly observed. Finally on the extreme right portion of data, for the region with the highest values in the data set, digital inequality reaches extreme proportion, landing digit one ("1") typically 40%, 50% or even higher portion of total distribution, leaving very little for high digits. This pattern shall be called here DIGITAL DEVELOPMENT PHENOMENON or DDP. An extrapolation of the conjecture is that such patterns are even more prevalent and general than Benford's law itself, and are seen in numerous non-Benford pieces of accounting and financial data, such as payroll amounts, data with built-in minimums or maximums, and others. Therefore, this (digital) signature within a (digital) signature can be employed in any generic computer programming system for the detection of fraud in areas that was hitherto outside the scope of the statistician/programmer attempting to forensically examined data via digital analysis.

Accounting data that does not conform to Benford's Law such as Payroll data and others should still show this clear graduation from an approximate digital equality or even predominance of high digits on the left-most part of the data, to the logarithmic around center, culminating in severe inequality on the far right. This is so since they are inherently random and statistical processes, as oppose to being deterministic. Absence these kinds of patterns should trigger an indication to the auditors and data analysis that data merits further investigation, especially if digit distribution is shown to be very consistent and roughly uniform across those mini sub-intervals along the entire range.

The method, to be called DIGITAL DEVELOPMENT METHOD, or DDM, is designed to go one step beyond the traditional Benford's Law technique of fraud discovery. The method also provides for a standard computerized algorithm in exactly how those sub-intervals are decided upon, namely: their ideal length and location within the entire range. It also provides for an exact (and singular) numeric measure of Benfordness on each of those sub-intervals, resulting is a series of such values, one per sub-intervals. The method then treats this measure as a Time Series and utilizes Simple Linear Regression as well as a complementary technique to determine whether or not Benfordness is constant across all sub-intervals. Computer implementation of all the above is typically performed in MS-Access and MS-Excel with the aide of Visual Basic Application (VBA) after the initial download from Internet Network or Internal Network System, provided there exist sufficient memory storage and computing processing power in device selected to compute above calculations. Other generic system languages could be employed such as C++, SAS, and S-Plus, to mention just a few.

This DDM method is also crucially useful for pieces of accounting and financial data that are inherently Benford but concocted by the well-educated and sophisticated cheater inventing numbers in such a manner that first and even higher orders of digits are according to Benford's Law—in the quest to make amounts appear as real as possible. It is certainly correct to assume that such a cleaver cheater would nonetheless not be aware of the patterns of development in leading digits distributions mentioned above, and would not be able to truly mimic real life data with all of its intricate and hidden inner properties. Unknowingly, he or she would naturally concoct data in such a manner where the Benford property is true, consistent, and steady throughout the entire data, mistakenly creating deterministic-like data modeled on multiplication processes, totally inappropriate for accounting and financial data which are inherently random and modeled on statistical processes. Another possibility is that such a sophisticated cheater would concoct fake data (unknowingly, as no attention whatsoever is paid to development by the cheater) with another developmental pattern style that is neither the steady deterministic one nor the gradual statistical one, or more often, with a meaningless zigzag pattern-less developmental style. DDM suggested here could easily detect such sophisticated manipulation and invention of non-existent data by the forensic observation of the absence of the expected evolution of those mini leading digits distributions along the entire range.

BRIEF DESCRIPTION OF TABLES AND CHARTS

The invention may be better understood by referring to the following description taken in conjunction with the accompanying tables and charts in which:

FIG. 5 is a table depicting the development of local First Leading Digits distributions along sub-intervals between adjacent integral powers of ten for the Census Area Data.

FIG. 7 is a table depicting the absence of any pattern in digital development and DS when partition is done incorrectly along values such 2, 20, 200, etc. for the Census Area Data.

FIG. 8 is a table depicting an approximately inverse pattern in digital development and DS when partition is done incorrectly along values such as 0.61563, 6.1563, etc. for the Census Area Data.

FIG. 9 is a table depicting the absence of any pattern in digital development and with all DS values being negative when partition is done incorrectly along values such as 0.8, 8, 80, etc. for the Census Area Data.

FIG. 10 is a table depicting the development of local First Leading Digits distributions along sub-intervals between adjacent integral powers of ten for the Payroll Data.

FIG. 12 is a table depicting the development of local First Leading Digits distributions along sub-intervals between adjacent integral powers of ten for the Event-Line Catalog Data.

FIG. 14 is a table depicting the development of local Second Order Leading Digits along sub-intervals between adjacent integral powers of ten for the Event-Line Catalog Data.

FIG. 17 is a table depicting the steady and constant First Leading Digits mini distributions between adjacent integral powers of ten for exponential 3% growth from a base of 10 having 468 elements, along with a consistent DS being near zero throughout the entire range.

DETAILED DESCRIPTION OF THE INVENTION

Figures 1, 2:
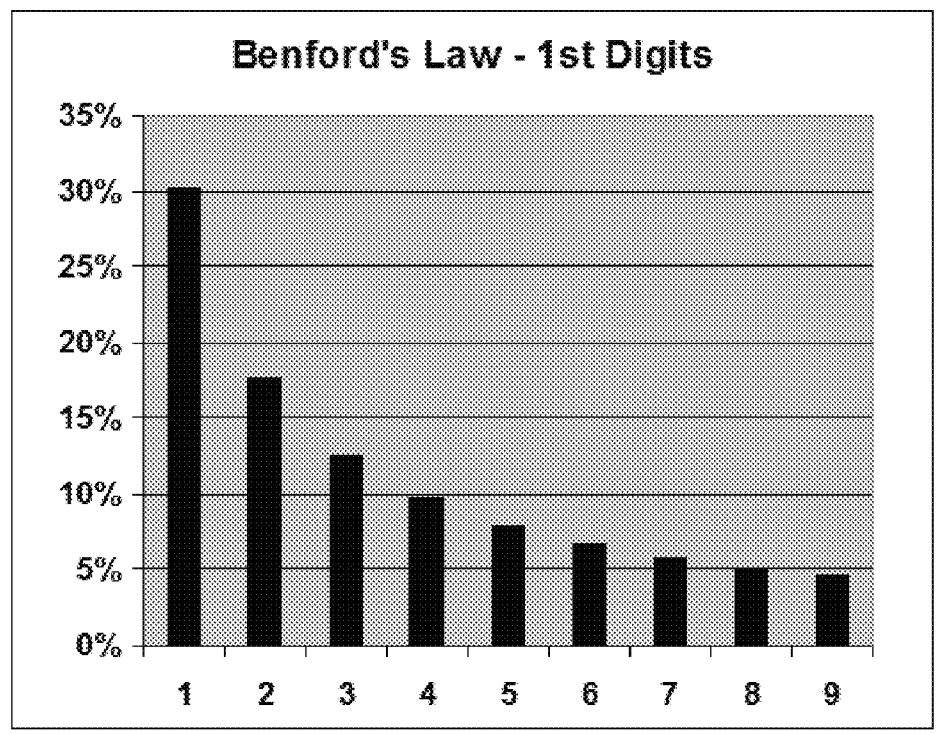
FIG. 1 is a table depicting the predicted distribution of decimal digits in a collection of values, per Benford's Law. Distribution of 1st Leading Digits is considered.
FIG. 2 is a chart illustrating Benford's Law regarding the distribution of the 1st Leading Digits.
Figure 3:
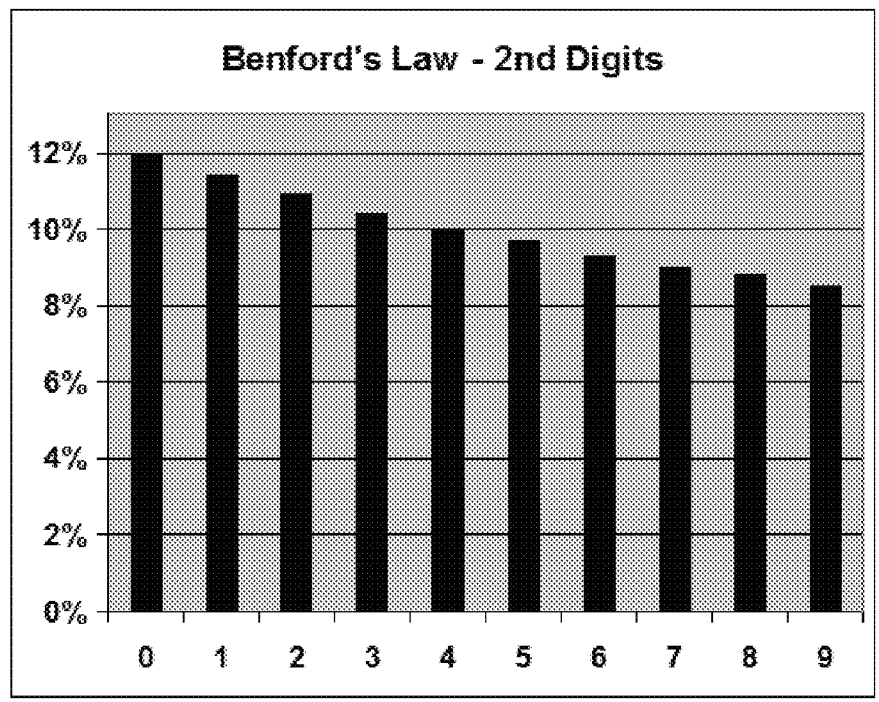
FIG. 3 is a chart illustrating Benford's Law regarding the distribution of the 2nd Leading Digits.

The basis of the invention is a method—called Digital Development Method (DDM)—utilizing a digital phenomenon conjectured by the inventor relating to a particular evolution or development of those mini digital distributions on sub-intervals along the entire range of data. The method calls for the data to be downloaded initially from the main memory storage device such as Internet Network, Wide Area Networking, or Internal Network System, and into program-able computer device employing Database processing software such as MS-Access or SQL, as well as spreadsheet format software such as MS-Excel (including other comparable generic software systems), and then to be ordered low to high and for the focus of digital pattern (of first leading digits primarily) to be severely narrowed down to much smaller pieces of overall data. Such digital examination then shifts focus from one small sub-interval to another adjacent one to the right, and patterns are recorded. Instead of performing digital analysis on the entire data set as is the standard in the literature, the suggested algorithm here is for performing multiple smaller ones. The conjecture points to a certain pattern that appears extremely stable, consistent and robust. The pattern in question is the tendency of those localized mini digit distributions to either favor slightly high digits or start with digital equality on the left for low values, and to gradually switch behavior and grant low digits increasing portions, culminating in severe digital inequality on the extreme right in favor of digits 1 and 2, an inequality that is by far more skewed than the Benford distribution. This more detailed digital signature of data within the digital signature of overall data is derived from some very general theoretical, symmetrical, and intuitive considerations as will be explained in the next paragraph. Confirmations of this digital phenomenon via actual testing of numerous pieces of real-life data—including ALL types of accounting and financial data—came out decisively in favor of the conjecture. Moreover, such forensic confirmation in real-life data occurred also in numerous other decisively-non-Benford data, confirming a corollary of the conjecture that this pattern is much more prevalent and general than even Benford's law itself.

Motivations for this newly discovered developmental pattern is derived from one well-known alternative vista in Benford's Law which focuses on the mantissa of data. This relates to the fact that a more general statement of Benford's Law is that density of mantissa is uniformly distributed on [0,1). This statement not only directly implies that for first digits distribution Probability[1st digit is d]=$LOG_{10}(1+1/d)$, but it also implies the formulae for the 2nd and all higher orders digit distributions, formulae and expressions which will not be mentioned here for brevity sake.

The definition of the mantissa of any number X is the unique solution to $|X|=[10^W]*[10^{mantissa}]$. Here W—called the 'characteristic'—is the result of rounding down $\log(|X|)$ to the nearest integer, namely the largest integer less than or equal to $\log(|X|)$, or equivalently the first integer to the left on the real number line $(-\infty, +\infty)$ of the log-axis regardless whether $\log(|X|)$ is positive or negative. Examples are:

LOG(130)=2.113943352 and Mantissa(130)=0.113943352.

LOG(0.0083)=−2.080921908 and Mantissa(0.0083)=0.919078092.

Having this general result well-established throughout the literature, namely expressing Benford's Law in terms of mantissa, focus is naturally shifting from examining densities of data itself to examining related densities of LOG of data in the context of Benford's Law and Leading Digits in general.

Intuitively, there are only two distinct natural scenarios for LOG density of data to achieve uniformity of mantissa. The first, very obvious scenario, is simply whenever density of related LOG itself is uniformly distributed on the LOG-axis along a range having exactly an integral length. Surely if density of related LOG itself is linear, horizontal and flat, namely uniformly distributed from say 1 to 8 (having exactly an integral 7-unit length on its axis), then its fractional part (mantissa) is also uniformly distributed, and thus data itself is Benford. In this case, density of mantissa is calculated by simply aggregating LOG density on those 7 different sections (having unity length) between 1 and 8. Yet, this scenario of uniformity of LOG density itself is conjectured and shown to be connected exclusively with deterministic multiplication processes, not random ones. This is done by exploring related LOG of exponential growth series, since these series are the most generic representatives of multiplication processes. For such exponential series $\{B, Bf, Bf^2, Bf^3, \ldots, Bf^N\}$ where B is the base value, P is the % growth, and f the constant multiplying factor $f=(1+P/100)$, related LOG series is simply:

$\{LOG_{10}(B), LOG_{10}(B)+LOG_{10}(f), LOG_{10}(B)+2*LOG_{10}(f), \ldots, LOG_{10}(B)+N*LOG_{10}(f)\}$. We note that $LOG_{10}(f)$ typically is thought of as being less than 1, namely a fraction, unless growth is exceedingly high. For example, for 15% growth, P=15, and $f=LOG_{10}(1.15)$, namely the fraction 0.06069784, while for high growth such as 100%, P=100, and $f=LOG(2)$ is still only 0.301029996, namely a fraction. Now, since this related LOG series is nothing but the steady additions of the same fractional constant, namely $LOG_{10}(f)$, from a fixed point, namely $LOG_{10}(B)$, tramping steadily on the LOG-axis with even steps, filling it up equally everywhere, we conclude that related LOG here is uniformly distributed (albeit discretely, not continuously). It is noted that the approximate or the most appropriate continuous LOG density function here is p.d.f.$(x)=k/x$, which also has its related LOG density uniformly (and continuously) distributed.

One very important result here is that having flat uniformly distributed related LOG density throughout the entire data implies that cutting off smaller pieces from the ordered data between any two points having an integral exponent difference, such as 10 & 100, 1 & 1000, 39 & 390, and so forth, still yields flat uniform LOG density locally, and thus implying uniformity of mantissa and Benford's behavior as well for the extracted sub-interval. Hence it might be said that the Benford property for deterministic multiplication processes and k/x distribution is consistent, steady, and that it manifests itself everywhere along the entire range equally. It is noted that if two data points have an integral exponent difference, then there is an integral distance between their corresponding points on the LOG-axis itself. Hence 10 & 100, written as $10^1$ & $10^2$ correspond to points 1 & 2 on the LOG axis. While for 71.6143 & 7161.43, written as $10^{1.855}$ & $10^{3.855}$, exponent difference is 2, and the two points correspond to 1.855 & 3.855 on the LOG axis.

Little reflection is needed to realize that uniformity of LOG of data over an integral interval is not the only circumstance yielding uniformity of mantissa. The other natural scenario yielding uniformity of mantissa is for density curve of LOG to be roughly Normal or to resemble a semi-circle form. More generally, LOG of data should be:

(a) roughly continuous, (b) having wide enough range on the LOG-axis (roughly over 3 or 4 units of distance), (c) rising from the log-axis itself until reaching a certain plateau or zenith, followed by a fall all the way back to the log-axis, (d) both the rise and the fall are not too steep but rather gradual.

This second LOG scenario is the one corresponding to ALL random statistical processes, including financial and accounting data, distinctly differentiating it from deterministic multiplication processes. This last statement is supported by theoretical understanding of what drives random statistical processes towards logarithmic behavior, as well as numerous confirmations from forensic testing of LOG densities of actual real-life data, including financial and accounting ones.

In general, for any small segments of data having its related LOG density portion locally/momentarily uniform, appearing horizontal and flat, the Benford's property is thought to hold. For LOG density to ascend and to have a positive slope implies that digits of related data itself are more equally distributed as compared with Benford. This is so because ascending LOG always gives more area under the curve to the right where high digits are and less so to the left where low digits are. For LOG density to descend having a negative slope, it means that severe digital inequality exists, even more extreme than the Benford condition. Therefore, for this second scenario, where LOG density is Normal-like or resembling a semi-circle form and traverses plenty of LOG-axis distance, the curve which ascends on the left of the central region (meaning that high digits are benefiting as compared with the logarithmic situation) and then steadily falls off and descends from there (meaning that now low digits get an advantage over and above the logarithmic situation), all which implies that overall mantissa could in principle end up uniformly distributed in the aggregate, as each section, the right and the left one, counteracts each other's effect. It is plausible to argue that whatever low digits lose (in relation to the logarithmic) on the left of the highest point (rising) is exactly what they gain to the right of it (falling), and regardless of location of the center! On the other hand, for symmetrical distributions representing LOG of data that are too narrowly focused on the LOG axis having too small a range, there is no such meaningful trade-off. For example, related LOG strictly bordered by 7.904 and 8.000 (hence generating mantissa on [0.904, 1.000) exclusively) resultant LD distribution of the data itself necessarily consists of only 8 and 9 first digits, and regardless of the shape of its related log curve.

Figure 4:
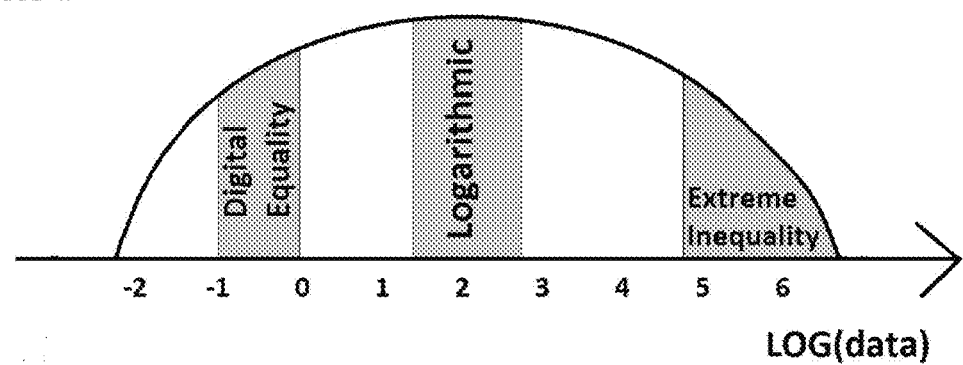
FIG. 4 is a graph showing a typical density of related LOG of random and statistical data with its digital status and development throughout the range.

The curve in FIG. 4 is a chart showing hypothetical density of LOG of some random/statistical data or distribution. On the extreme left high digits in a rare show of force are winning slightly, then digital equality in achieved exactly only at a single point if curve is truly smooth, and it is approximated here to be as such on a slightly wider interval for visual clarity. Further on, low digits win slightly, followed by logarithmic behavior, and then low digits win even more than that, and so forth. Gradually we end up on the extreme right side where low digits almost completely dominate all other digits, much more than their normal logarithmic advantage. Intuitively all this suggests some grand trade-off between the left region and the right region, leaving the logarithmic center as a good representative of the aggregate digital behavior of the entire range.

The above argument could be stated more succinctly by claiming (conjecturing) that random/statistical data and distributions obeying Benford's Law are roughly LogNormal-like distributed. This last conjecture pertains mostly to Ted Hill's distribution of distributions model presented in his celebrated rigorous proof of the random/statistical manifestation of the phenomena. This last statement is supported by symmetrical and intuitive consideration, as well as by numerous confirmations gotten from actual examinations of LOG densities of real-life data, including accounting and financial ones, where density of related LOG consistently appeared Normal-like or semi-circular-like. A more detailed analysis is given in Alex E. Kossovsky, "Towards A Better Understanding Of The Leading Digits Phenomena (Benford's Law)", Cornell University Library Publishing site arXiv.org, http://arxiv.org/abs/math/0612627.

The detailed techniques and algorithms within the entire method of the invention for the purpose of detection, download of data from memory devises, computer calculations, evaluation, memory storage of intermediate numerical results, comparison, and inference of any such possible digital evolution along the entire range of data will now be described in the next few paragraphs.

The first task of DDM is to decide upon the exact nature of the computerized partitioning of the entire range of data into much smaller and adjacent sub-intervals for system processing. Clearly, sub-intervals need to be compatible and equal regarding their digital possibilities in order for the tester to perform fair comparisons. Sub-intervals do not have to be of the same size in the usual distance/length/range sense, but rather in a digital sense. We seek an equality of digital opportunity between the various sub-intervals, not equality of length between them. It is only in order to obtain equal digital opportunity between the digits themselves within any single sub-interval that we require that each of the 9 digits should occupy the same distance/range in the usual sense within that given sub-interval. Thus, the requirement for the proper comparisons of digital conditions between sub-intervals necessitates constructing them in one very particular fashion by letting them stand between two adjacent integral powers of ten such as (0.1, 1], (1, 10], (10, 100], ($10^2$, $10^3$], and so forth. In general LD-proper interval is written as ($10^N$, $10^{N+1}$] where N is an integer, and the difference in the exponent is exactly unity. Sub-intervals constructed in ANY other way wouldn't do. Proper digital pulse can not be taken correctly unless evaluated between adjacent integral powers of ten points. The improper shorter sub-interval (10, 90] does not yield any numbers with first digit 9 (except for 90 itself) no matter what density function curve is hanging above, hence it's too short in the context of Leading Digits. Same difficulty exists with the improper sub-interval (20, 100] where digit 1 doesn't have a chance to occur except just once. In contrast, the sub-interval (10, 200] is too long in our context because here digit 1 gets some undeserved advantage, dominating the portions (10, 20) as well as (100, 200], leaving by far less ground for digits 2 through 9 (although the specifics of the density curve above could potentially mitigate this digital bias). On the other hand, the LD-proper sub-interval (10, 100] has that Leading-Digits-wholeness property that the forensic data analyst should seek in order to make valid comparisons. Here each digit is given an opportunity to express its leadership equally, and each dominates an equal portion of the length of the sub-interval. For example, digit 1 dominates (10, 20), digit 2 dominates [20, 30), digit 3 dominates [30, 40), and so forth.

Different considerations also preclude choosing a longer sub-interval in this context. Choosing sub-intervals between two NON-adjacent integral powers of ten such as (10, 1000]—which can be expressed as ($10^1$, $10^3$]—obscures pure comparisons. Such a choice could potentially confuse Leading Digits travail occurring on (10, 100] with a totally different one occurring on (100, 1000], thus these two sections should not be mixed.

Aggregating Leading Digits here, instead of summarizing, would simply mask and obscure the more detailed forensic occurrences happening on each of the two separate sections.

In summarizing such a partition of the entire range it is noted that there is NO equality of length BETWEEN sub-intervals, but rather equality of length for all 9 digits WITHIN any given sub-interval.

On the face of it, it might first appear that a more flexible requirement for an interval to be sufficiently proper for the purpose of comparisons of digital conditions would be merely to have an exact unity exponent difference at the edges.

For example, ($10^{3.778}$, $10^{4.778}$], ($10^{83}$, $10^{93}$], (2.5, 25], (5.97, 59.7], (20, 200], and so forth. A decimal shift once to the right increases original number (the left edge) by a factor of 10 and increases its exponent by unity (yielding the right edge). Supposedly, in Leading Digits context, all 9 digits are given a chance to lead in such cases. For example on (20, 200], digit 1 dominates [100, 200), digit 2 dominates (20, 30), digit 3 dominates [30, 40), and so forth. Yet, for an interval such as (20, 200], digit 1 dominates ten times more range than any other digit, and this implies some bias. Although this bias potentially could be mitigated via some very particular density curve above, it should be strictly avoided. In contrast the more natural proper interval, the one between adjacent integral powers of ten such as (10, 100], fairly allocates equal length for all 9 digits within it.

In conclusion, sub-intervals standing between adjacent integral powers of ten, constitute a very natural choice in Leading Digits, as it is just wide enough to manifest and express the digital arrangement of any given subset of data, be it Benford or otherwise. INDEED, IT IS ONLY THROUGH THIS DIGITAL LENS SUGGESTED IN THIS METHOD THAT DIGITAL DEVELOPMENT CAN BE SEEN. When other misguided partitions (even those having an integral exponent difference) are actually performed and experimented with on data sets that in themselves show clear digital development patterns under the correct magnifying glass of adjacent integral powers of ten partitions, the results typically do NOT show any discernable pattern, and at times yield some incoherent or even inverse LD developmental patterns. Fortunately for the forensic data analyst tester it should be noted, there are almost always plenty of such sub-intervals. It is extremely rare for typical everyday data, including financial and accounting data, to be confined entirely within a single interval standing between two adjacent integral powers of ten. This fact makes the DDM quite feasible in all situations, except in some very rare cases.

It is noted that insufficient and uneven data (in a digital sense) falls on the two extreme sub-intervals to the left and to the right. Generally, whenever insufficient and uneven data falls on any sub-interval, leading digits can not fully express their true configuration even though sub-interval is properly standing between two points made of adjacent integral powers of ten, as their perceived LD-sufficient width simply masks the deficiency and unevenness of actual data within. Interestingly in our context, typically most of the data in the left-most sub-interval is within the right side of it where high digits lead, and most of the data in the right-most sub-interval is within the left side of it where low digits lead, in other words, data is concentrating or gravitating more towards the overall center of the entire data set, as if being pulled by it. In reality, this perceived bias is actually in complete harmony with the entire phenomenon of digital development outlined above, as it reinforces the overall trend of stronger presence of high digits on the left, and stronger presence of low digits on the right. For example, on the edge, for the left-most sub-interval (1, 10] having the lowest values in the entire data set, a typical set of values falling there would be say {6, 7, 9, 5, 8, 9, 9} an exact opposite of the Benford situation. And for the right-most sub-interval (1000, 10000], a typical set of values falling there would be say {1187, 1434, 2083}, namely an extreme digital inequality far more extreme than the Benford condition. It follows then that this extra push toward differentiation of digital proportion along the entire range enhances and reinforces robustness of the algorithm. It is noted that often DDM draws its cues from the very left and right edges on the margin of data which hints at the correct digital development form.

Hence the following statistical and computer techniques are recommended:

(1) Construct the following partition of data and store in memory device:

Divide the entire range of data into the relevant sub-intervals bordered by adjacent integral powers of ten, such as (0.1, 1], (1, 10], (10, 100], (100, 1000], ($10^3$, $10^4$], and so forth.

This is implemented by computing in the relevant computer software device the following border-values for the left-most sub-interval which stands between:

10 [to the power of] INTG(LOG(MIN)) and
10 [to the power of] (INTG(LOG(MIN))+1)

And computing the border-values for the right-most sub-interval which stands between:

10 [to the power of] INTG(LOG(MAX)) and
10 [to the power of] (INTG(LOG(MAX))+1)

Where MAX and MIN being the extremes values within the entire data set, and INTG is a function yielding an integral value and discarding the fractional part of any number, while leaving integers unaltered. The function INTG in MS-Excel is called INT, while different functional names are applied in other generic system languages.

As an example, suppose MIN equals 3, then the left-most sub-interval in the partition is between 10 [to the power of] INTG(LOG(3)) and
10 [to the power of] (INTG(LOG(3))+1) or
10 [to the power of] INTG(0.477) and
10 [to the power of] (INTG(0.477)+1) or
10 [to the power of] 0 and
10 [to the power of] (0+1)

Namely the sub-interval on (1, 10], which contains the minimum value of 3 of course. It is noted here that now the portion within the sub-interval (1, 10] to the left of the value 3 is empty, and digits 1 & 2 do not lead any numbers, further reinforcing the overall gradual digital development, as mentioned earlier. Similarly, a MAX value of 7468 points to the right-most sub-interval of (1000, 10000] in the partition.

(2) Once the partition is made, first digit distribution is calculated separately for each sub-interval treating them as completely distinct data sets, and output is stored in relevant computer memory storage device for later use as input.

(3) A summary numeric table is constructed within the computerized device from the various output above showing digital results from all sub-intervals, as well as weights of sub-intervals within the entire dataset in terms of amount of data falling within it.

(4) As a rule of thumb, any sub-interval with less than 0.1% of overall data (one tenth of one percent) should be selected as an outlier and excluded from subsequent computer calculations to avoid distortions in overall result. This is so since subsequent techniques purposely do NOT weigh individual sub-intervals to account for their proportion of overall data, as there is a need here to obtain the (un-weighted) leading digits configurations of all sub-intervals and to have them contribute equally to the overall measure of development.

(5) A computer algorithm is now performed to enable the data analyst to determine subjectively whether or not these mini leading digits distributions truly follow the developmental pattern mention above. A single quantity called Digital Skewness (DS) is calculated for each sub-interval. DS expresses the degree digit distribution is skewed in favor of low digits over and above the logarithmic distribution.

(6) The method defines Digital Skewness as the sum of (Ai−Bi)/Bi for digits 1 and 2, and (Bi−Ai)/Bi for digits 6, 7, 8, and 9. Digits 3, 4, and 5, are ignored. Ai denotes the Actual proportion of numbers with first digit i within the specific sub-interval in question. Bi denotes the proportion of digit i according to Benford's Law. That is:

$$DS=\text{Digital Skewness}=(A1-0.301)/0.301+(A2-0.176)/0.176++(0.067-A6)/0.067+(0.058-A7)/0.058+(0.051-A8)/0.051+(0.046-A9)/0.046$$

It is noted that for perfectly Benford data DS is zero. A positive DS values indicates that data is even skewer in favor of low digits than the Benford condition. A negative DS value implies in general one of the following 3 scenarios: (A) Digits are a bit less skewed than Benford. (B) There is a near digital equality. (C) High digits win slightly/strongly.

For example, for the distribution severely skewed (in favor of low digits) such as
{45%, 22%, 15%, 6%, 3%, 3%, 3%, 2%, 1%}

$$DS=(0.45-0.301)/0.301+(0.22-0.176)/0.176++(0.067-0.03)/0.067+(0.058-0.03)/0.058+(0.051-0.02)/0.051+(0.046-0.01)/0.046$$

$$DS=0.495+0.250+0.552+0.483+0.607+0.783=+3.17$$

For a distribution having nearly digital equality such as
{13%, 13%, 11%, 11%, 11%, 15%, 8%, 9%, 9%}

$$DS=(0.13-0.301)/0.301+(0.13-0.176)/0.176++(0.067-0.15)/0.067+(0.058-0.08)/0.058+(0.051-0.09)/0.051+(0.046-0.09)/0.046$$

$$DS=-0.568+-0.261+-1.239+-0.379+-0.765+-0.957=-4.15$$

Note that DS of the entire data set itself always equals the sum of DS over all sub-intervals weighted by the proportion of overall data within each one. In other words, DS of data set itself is the weighted average of the various DS. No matter how we partition the range, as long as we do not omit nor overlap any segment, the weighted sum of all DS is a constant, partition-invariant, and equals to DS of the entire data set.

(7) For the sake of conducting regression analysis with the appropriate software device, DS values from the above computer storage devices are to be selected as a dependent variable and are associated with an arbitrarily defined independent variable Ni—the natural numbers—serving as an index, so that the first sub-interval, the left-most one, is given the independent value 1, the next one to the right of it is given the value 2, and so forth, until we reach the Last value called L—the total number of relevant sub-intervals in the method for the particular data set in question, outliers excluded. Conveniently, DS can be thought of as a Time Series in order to utilize standard statistical and software procedures. Plotting DS versus Ni in a scatter graph always shows clearly that there are solely two scenarios that are quite distinct from each other:

(a) an approximately ascending line, starting with negative values which typically are around −7 units, rising steadily (having positive slope), and ending with positive values typically around +5 units, a scenario observed exclusively in random statistical processes, or (b) an approximate horizontal line (zero slope) with all DS values being close to zero, for deterministic multiplication processes, or for fake data invented in such a way as to make it appear to be in conformity with Benford's Law everywhere throughout the entire range.

(8) Four computerized tests serving as software output are to be performed to identify reported financial and accounting data as either supposedly honest and in conformity with its supposed random and statistical nature, or as fraud. Failure to pass any one of the four tests should identify it automatically as suspicious and for computer output to select it as due for further investigation.

Programming System performs Simple Linear Regression of DS on Ni, DS being the dependent variable, and scheme to be modeled on Y=m*X+b namely we regress DS=m*Ni+b where m is the slope and b is the DS intercept. Using the computer output of the solved values of m & b, extreme DS values on the regression line are calculated by letting Ni take the values 1 & L.

That is: DS_left=m*1+b and DS_right=m*L+b.

System Test I:

Reported data passes test I if the output of the following 2 conditions are true:

DS_left<−5 AND DS_right>+3

Motivation: It is necessary to confirm that overall DS curve is sufficiently and significantly negative on the left and positive on the right. Empirically, those two cutoff points of −5 and +3 are well within what is always observed in honest statistical data, and were chosen in a liberal sense so as to minimize the chances of false positive (type I error). Instead of checking actual DS values of the right-most and of the left-most sub-intervals without doing any regression, and ignoring the central region, it is suggested to use regression so as to smooth out any abrupt deviation on the right or on the left, and to take the overall developmental pulse coming out from all sub-intervals together, including central ones.

System Test II:

Reported data passes test II if the following output is true: Sum of absolute values of all DS numbers >18.

Motivation: It is necessary to confirm that DS curve lies mostly well above and well below zero throughout, and not only at the edges, but also around the central region, as is the case with almost all honest statistical data. In other words: we insist on this sum to be large in order to exclude false negative cases where central region is roughly zero (contrary to theory) and where only the two extreme sub-intervals exceed and exaggerate theoretical development thus managing to manipulate regression line to appear as if complying with the supposed pattern. By summing up absolute values throughout we could overcome the occasional errors and traps set up by the regression method itself.

(9) The same computer analysis can also be performed on 2nd leading digits. But here typically the random element often overwhelms the systematic one, obscuring results. This is so because of the more delicate differences between the digits here, being that 2nd order digit distribution is not nearly as skewed in favor of low digits as in the case of the 1st leading digits. DDM can be performed with satisfactory results for 2nd order LD whenever data set is quite large for sufficient clarity in the pattern of digital development to be observed. The suggested cutoff number for a meaningful and significant 2nd order DDM test in any software system is having a minimum of 10,000 values in the data set, otherwise in order to avoid Type I error (false positive, namely an honest accounting data identified for suspicion due to failure of DDM test done on 2nd order digits) it is advisable NOT to select it as part of the forensic digital analysis.

The method herein suggests sticking to a software partition along adjacent integral powers of ten for the 2nd order Leading Digits test as well. This is so in spite of the fact that the full cycle of 2nd leading digits is much shorter, being merely 1-unit long equally and consistently everywhere. For example, from 7.0 to 8.0 all 2nd order digits possibilities get a chance to manifest themselves, with digit zero 2nd leading on [7.0, 7.1), digit one 2nd leading on [7.1, 7.2), digit two 2nd leading on [7.2, 7.3), and so forth. The reason DDM suggests testing 2nd order along 1st order lines of 1, 10, 100, and so forth, is due to the interdependency of orders. For example, 2nd order probabilities depend on 1st order probabilities, and it is more skewed in favor of 2nd-order low digits when 1st-order digits are also low. By selecting sub-intervals in which all 1st order digits are equally represented such as 1, 10, 100, etc., DDM by extension also allows all 2nd order digits equal opportunity to express themselves.

For 2nd leading digits test we define 2nd-order-Digital Skew-ness (DS2) as the sum of: (i) the positive percentages of the deviations over and above the 2nd order Benford condition for the lowest 3 digits, and (ii) the negative percentages of the deviation below the 2nd order Benford condition for the highest 3 digits; namely:

$$DS2=(A0-0.120)/0.120+(A1-0.114)/0.114+(A2-0.109)/0.109(0.090-A7)/0.090+(0.088-A8)/0.088+(0.085-A9)/0.085$$

Ai being the actual proportion of numbers within the sub-interval having second digit i.

System Test III:

Reported data passes test III if the output of the following 2 conditions are true:

DS2_left<−1.5 AND DS2_right>+1.0

System Test IV:

Reported data passes test IV if the following output is true: Sum of absolute values of all DS2 numbers >4.

All of the various real-life amounts forensically examined by the developer of this method regarding verified (honest) financial and accounting data passed the four liberal tests above with flying colors. Typically DS_left hovers around −7, DS_right around +5, and sum of Absolute(DS) around 22. Also, typically, for large data sets, DS2_left hovers around −2.0, DS2_right around +1.5, and sum of Absolute(DS2) around 6.

On the other hand, computer simulations of deterministic data derived from multiplication processes such as exponential growth and decay, demonstrate a totally different digital development, having constant and steady digital distributions throughout at the same Benford level, and with all DS and DS2 values around zero. An example of such series is given in the example section.

The method could possibly be refined into more exact theoretical developmental stages for some very particular sub-types of data such as inventory expense accounting data, salary expense data, dividend payments, populations count, some particular length measurements, accidents per year of a particular type, and so forth, and then implemented in any generic computer software, potentially showing different average expectation of development style for each different sub-type, thus enhancing tests. For example, sum of absolute values of DS for payroll may be typically at a minimum 23, but only 17 for typical inventory expenses. Although this can only be done by paying in reduced robustness of tests.

Also of note is that the left portion of digital equality and the right portion of extreme digital inequality typically represent a smaller portion of overall data, while the roughly logarithmic center contains the bulk of the data. If a corporation files its income tax by providing data that not only is nicely logarithmic, but also on the face of it comes with the basic correct developmental style outlined here, but where most of the data lies on the 2 regions of digital equality and severe digital inequality, then suspicion could and should arise.

In summing up Digital Development Method's functionality, it can be said that it facilitates fraud detection by scrutinizing that digital signature within a signature, utilizing the fact that not all logarithmic data are created equal, but rather being created always along two unique flavors, the consistent and steady deterministic type, and the gradual random one.

APPLICATION EXAMPLES OF THE METHOD

Example I

US Census—County Area Data

Census Data on areas of all 3143 counties in the USA was examined from the US Government Census website http://www.census.gov/support/USACdataDownloads.html#LND where "Land Area" is selected with a choice of LND01.xls for data downloads. The data on column X called LND110210D was selected for testing. It was necessary to eliminate from the data the sums of 51 States and District of Columbia total amounts, USA total, as well as 3 entries having 0 as area, resulting finally in areas for 3143 counties. It is certainly proper to assume that this data set is genuine of course and that the Census Agency has no reason or motivation whatsoever to invent fictitious area values.

The data is not logarithmic at all. Digital distribution is:
{16.2%, 10.0%, 10.7%, 15.8%, 15.2%, 10.4%, 8.6%, 7.1%, 5.9%}.

Digital distribution is not even monotonically decreasing. It does not have the attributes of the more typical type of data sets in everyday life. The spread of the data is small, focused too narrowly on certain magnitudes. Yet, the digital developmental pattern in this method is clearly seen here even for this more general type of data. Partition along adjacent integral powers of ten resulted in the right-most sub-interval containing only 0.03% of overall data, having only a single value, hence according to method's rule outlined earlier, it was selected as an outlier and excluded from further calculations.

Figure 6:
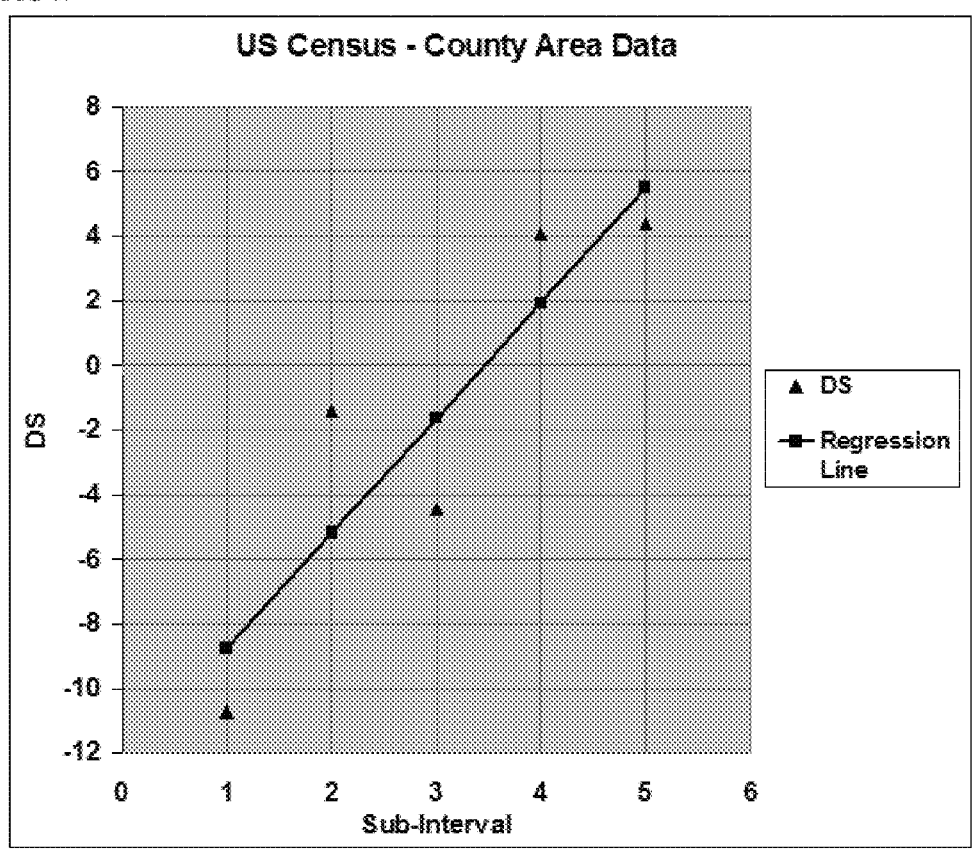
FIG. 6 is a graph illustrating actual points and regression line of Digital Skew-ness (DS) for the Census Area Data—along the proper partitioning by integral powers of ten.

FIG. 5 shows a computer output table of digital development of Census Area data for the correct partition along adjacent integral powers of ten. FIG. 6 shows a computer output of the chart of the rising curve of DS as well as its related regression line.

DS series are: −10.7 −1.4 −4.5 4.1 4.4

DS_left=−8.7 DS_right=+5.5 sum of Absolute(DS)=25.0

Data easily passes both (1st order) tests suggested herein, confirming its statistical nature as oppose to the deterministic. 2nd order tests were avoided with data having less then the 10,000 threshold number of entries. This potentially could give the UN for example a digital forensic ability to check on any government trying to invent data of area reported (assuming for example that perhaps some financial benefits and aide given to a country are tied to area amounts). Although such data types do not conform to Benford's Law and thus couldn't have been previously forensically verified, the method presented herein provides a venue for such a test nonetheless.

Other partition styles wouldn't do, only adjacent integral powers of ten.

See FIG. 7 for a computer output of an example of another partition along 2, 20, 200, 2000, and so forth. For this incorrect partition, there is no clear trend in DS series.

DS series are: −3.8 3.0 −3.4 2.3 3.2

Regression output here gives:

DS_left=−2.4 DS_right=+2.9

And sum of Absolute(DS)=15.8

Applying this incorrect partition, data now fails both tests, and a different (misguided) conclusion is drawn.

Nonetheless, calculating weighted sum of DS over all sub-intervals, we get the output: W.S.(DS)=−3.8*(0.009)+3.0*(0.038)−3.4*(0.862)+2.3*(0.088)+3.2*(0.003)=−2.6 which is the same value we get for DS of the entire data set (not partitioned), as well as the value gotten for the weighted sum of DS in the partition using integral powers of ten.

The result of another example applying an incorrect partition method is given in the computer output of FIG. 8. The choice of partition here was curiously motivated by the value of the median which is 615.63, and this is just another illustration of the need to partition data only along integral powers of ten in order to observe true developmental pattern. The (erroneous) pattern observed here is nearly a reversal of the true rising trend. Note again that sum of weighted DS values is −2.6 here as well.

FIG. 9 shows computer output of yet another example of a wrong partition method, along 0.8, 8, 80, 800, and so forth. In this case, all DS values come out negative. Clearly, only a partition along adjacent integral powers of ten can serve as the sort of digital lens through which those intrinsic digital development patterns can be seen.

Example II

Payroll Data

Payroll numbers generally do not follow Benford's Law. This is because there isn't enough of a spread when it comes to employee salaries. The reason being is that most professionals earn about the same salary level. When most teachers earn from $3,000 to $6,500 per month then most of the first digits are 3, 4, 5, or 6.

This example analyzes a data set that was sent to me recently by Mark Nigrini regarding payroll amounts for a certain US motel chain catering to thrifty travelers. This data set is now available on his website dedicated to his newly published book (February 2012) on Benford's Law: http://www.nigrini.com/benfordslaw.htm Referring to chapter 13 and the FIG. 13.2 for a MS-Excel file with payroll data named Figure13-02_Feb25th.xlsx The data set is the gross pay of all the employees. This example works under the assumption that this particular data set is honest because of some other known exogenous reasons. There are 9878 payroll numbers in the data set, and it is decisively not Benford, in fact leading digits distribution is:
{13.8%, 22.0%, 22.4%, 19.6%, 9.4%, 5.2%, 3.2%, 2.5%, 2.0%}

There is still some vague resemblance to Benford's Law as the trend calls for higher proportion of low digits overall. In any case, Benford's law can not be utilized forensically in this accounting data type. Yet, DDM suggested here offers a convincing and clear test of authenticity by examining digital development.

Figure 11:
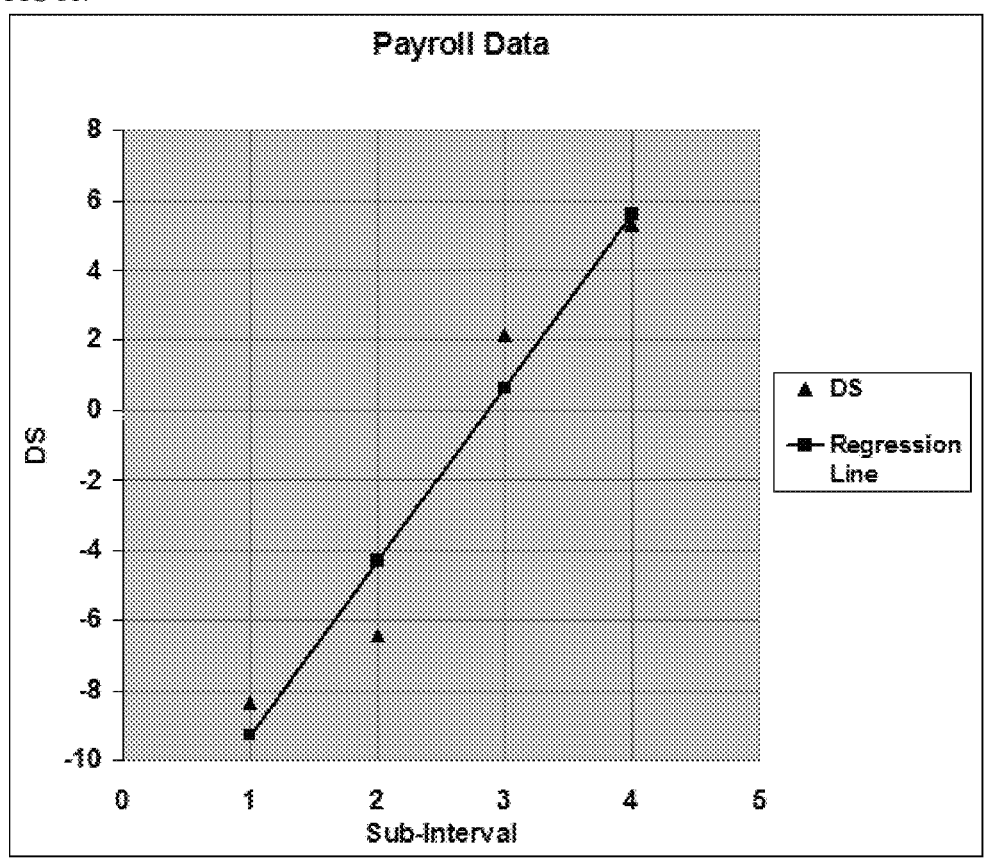
FIG. 11 is a graph illustrating actual points and regression line of Digital Skew-ness (DS) for the Payroll Data when done along the proper partitioning by integral powers of ten.

FIG. 10 shows computer output of the table of digital development of Payroll data under the correct partition along adjacent integral powers of ten, as well as resultant DS series. FIG. 11 shows computer output of the chart of DS series along with the associated regression line.

DS series are: −8.3 −6.4 2.1 5.3

DS_left=−9.3 DS_right=+5.6 sum of Absolute(DS)=22.2

Data passes both (1st order) tests suggested herein with flying colors, confirming its statistical nature as oppose to the deterministic. 2nd order tests were not carried out. The method potentially gives a new robust tool for auditors and forensic data analysts to test payroll data for authenticity.

Example III

Catalog Data

A catalog (a list of products and their prices) of a US firm called The Event Line is analyzed. The firm specializes in providing thousands of all kinds of equipments for events such as weddings, proms, casino parties, general meetings, and so forth.

An honest accounting data is generated (for any firm/company/entity) by simply picking up combinations of numbers from a catalog. A bill or receipt could be (i) a single value from the catalog, (ii) multiples of a single price when purchasing a quantity of a one item, (iii) linear combination from the catalog when purchasing several quantities of different items. Since the Benford property is unaffected under multiplications via the Scale Invariance principle, on the contrary, multiplication even strengthens logarithmic behavior, and aggregation of Benford sets also yields Benford, any conclusion from the analysis of the catalog itself can also be apply to the accounting data of the said firm. While accounting data may be fraudulent, catalog data is obviously always perfectly honest and such terms as 'incentive to cheat' etc. does not apply here. The website of the firm is:

http://www.theeventline.com/

On the home page the yellow bottom "CATALOG" is selected on the left side, and the MS-Excel file is downloaded. The right-most column is the price to be digitally analyzed (almost, as last column is empty). It is advisable to change the special formatting to a simple or default one, perhaps by applying the format brush icon on the data borrowing style from any other normal cell. After the eliminations of about 30 entries having the value 0, we end up with 1828 prices for items.

These prices are not exactly Benford but quite close to it, first digit distribution is:

{25.6%, 19.0%, 13.3%, 10.6%, 8.0%, 8.7%, 6.5%, 4.6%, 3.7%}.

In examining computer output of digital development here for a partition along adjacent integral powers of ten, DS series computer output came out as: −12.9 −9.8 −3.6 −2.4 2.3 4.0 5.3 which is extremely consistent with the method's outline as its series are consistently and monotonically increasing. However, due to insufficient data falling on the left-most and the right-most sub-intervals having only 1 value each, both were automatically eliminated as outliers from further analysis by the program code. Results are still very much consistent with the method's outline, and finally we get the computer output:

DS series are: −9.8 −3.6 −2.4 2.3 4.0

DS_left=−8.5 DS_right=+4.8 sum of Absolute(DS)=21.9

Figure 13:
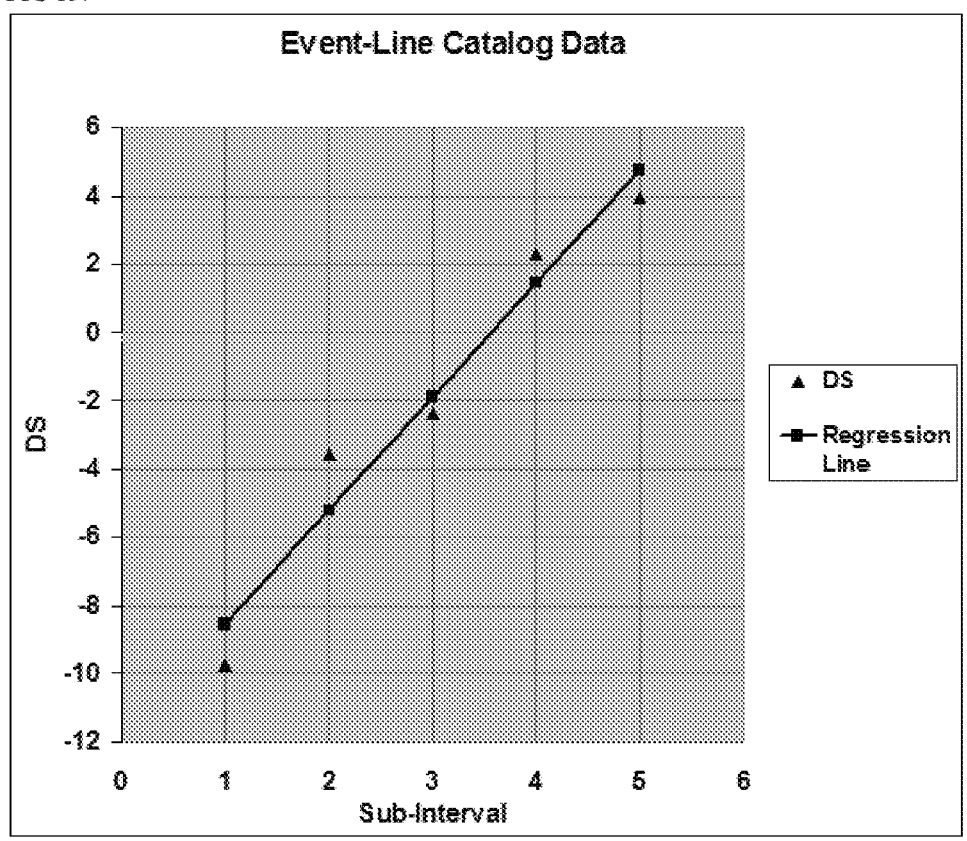
FIG. 13 is a graph illustrating actual points and regression line of Digital Skew-ness (DS) for the Event-Line Catalog Data done along the proper partitioning by integral powers of ten.

FIG. 12 shows computer output of the table of digital development of Event-Line Catalog data under the correct partition along adjacent integral powers of ten, as well as resultant DS series. FIG. 13 shows computer output of the chart of DS series along with the associated regression line.

Data easily passes both (1st order) tests suggested herein, as should be given its statistical nature and the obvious honesty and authenticity of the price amounts in its catalog.

Figure 15:
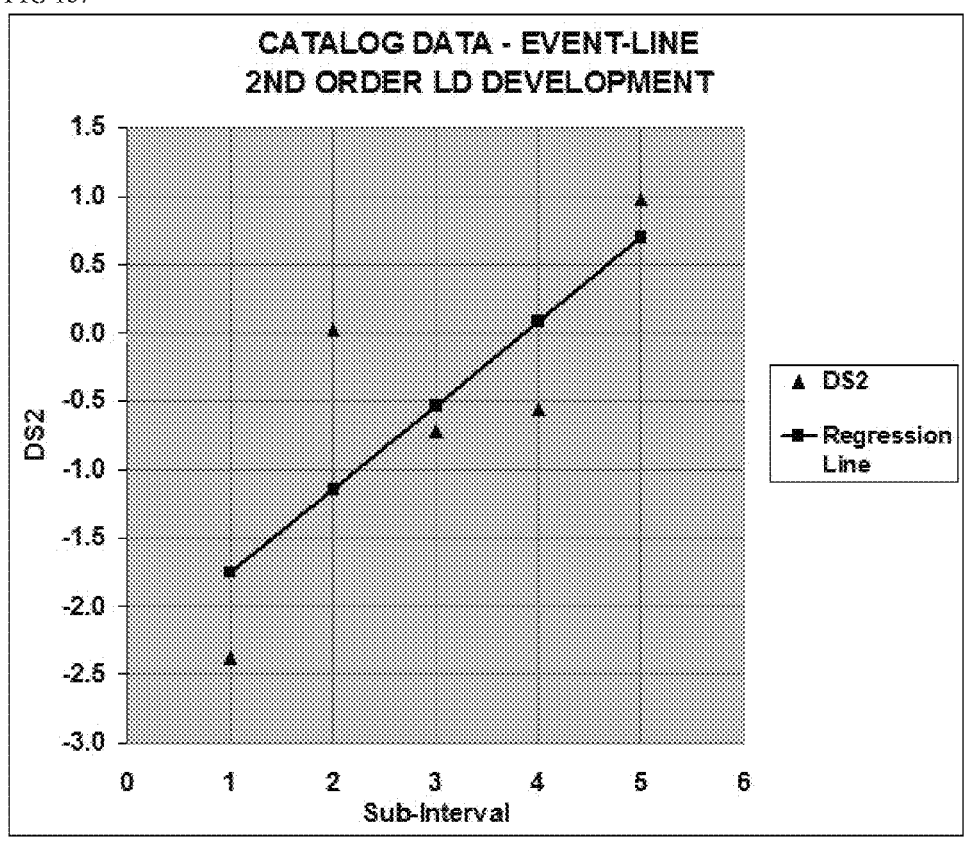
FIG. 15 is a graph illustrating actual points and regression line of 2nd order Digital Skew-ness (DS2) for the Event-Line Catalog Data.

Illustrating why DDM using 2nd leading digits should NOT generally be applied in the context of forensic data analysis for relatively small data sets, one such method was actually applied for this catalog data. See FIG. 14—computer output of the table of mini 2nd order leading digits distributions of Event-Line Catalog data, as well as FIG. 15 for the chart of DS2 and its associated regression line. A positive trend does appear here according the general principle of digital graduation outlines above, yet it is not as decisive and steady as in the 1st order case and fluctuations are no more than roughly 1 unit, all of which implies that test is not robust. In contrast, 1st order DDM is sufficiently robust.

Figure 16:
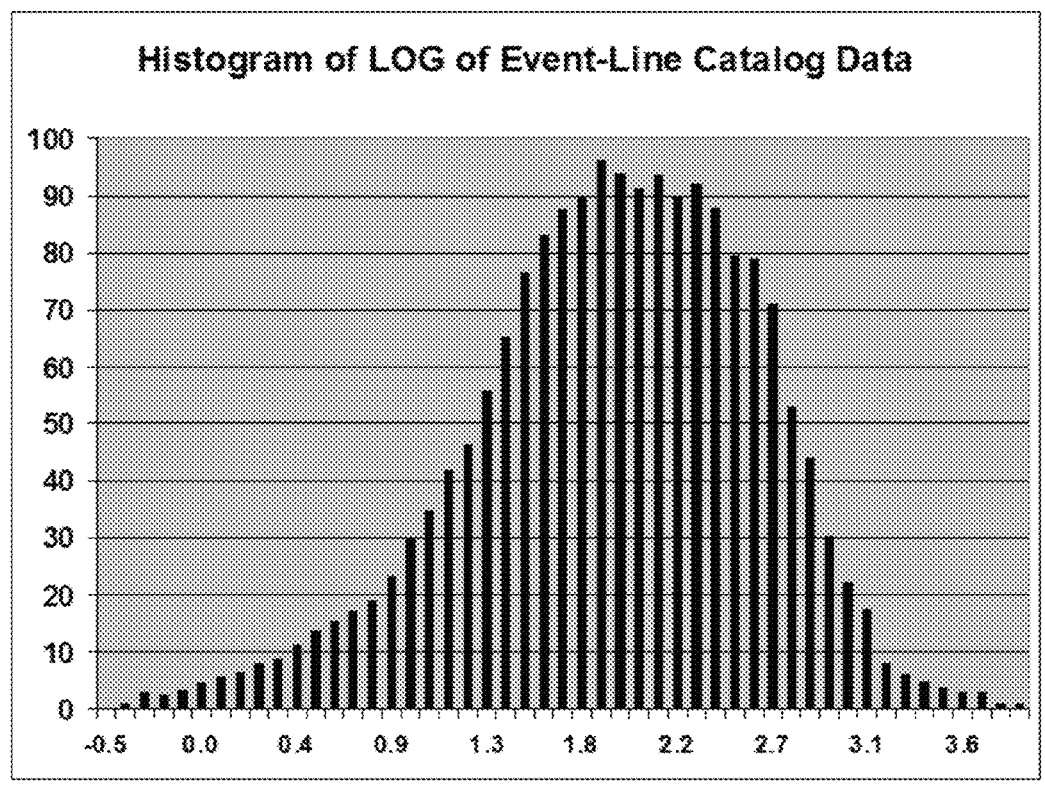
FIG. 16 is a graph illustrating the histogram (crude density) of related LOG values of Event-Line Catalog Data.

FIG. 16 depicts the computer output of the histogram (crude density) of related LOG of Event-Line Catalog Data which resembles the Normal distribution, confirming (at least in this case) the general conjecture made earlier that random statistical processes follow a LogNormal-like or semi-circular-like density curve, rising on the left and falling to the right.

Example IV

Exponential Growth

In order to demonstrate the very different nature of LD-development of deterministic multiplication processes, computer simulations of 3% exponential growth, starting at the initial value of 10 (and with the selection of the first 468 elements) were performed. See FIG. 17—computer output of the table of mini-LD distributions—demonstrating a totally different digital development here, having consistent and steady digital distributions throughout the entire range at the constant Benford level. All DS values came out very nearly zero.

Figure 18:
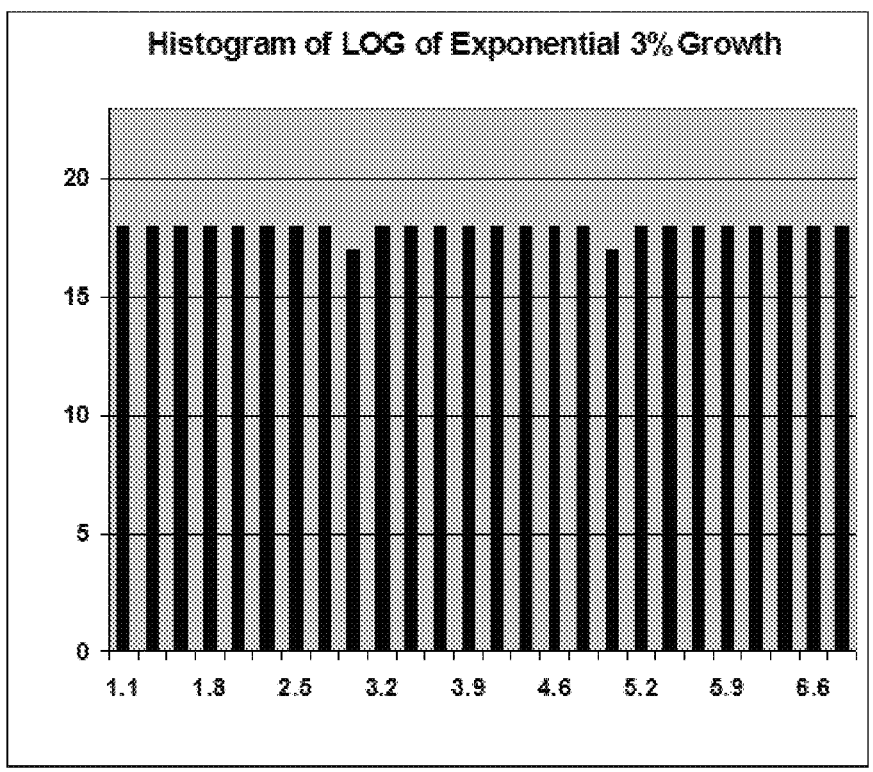
FIG. 18 is a graph illustrating a flat and uniform-like histogram (crude density) of related LOG values of exponential 3% growth from a base of 10 having 468 elements.
Figure 19:
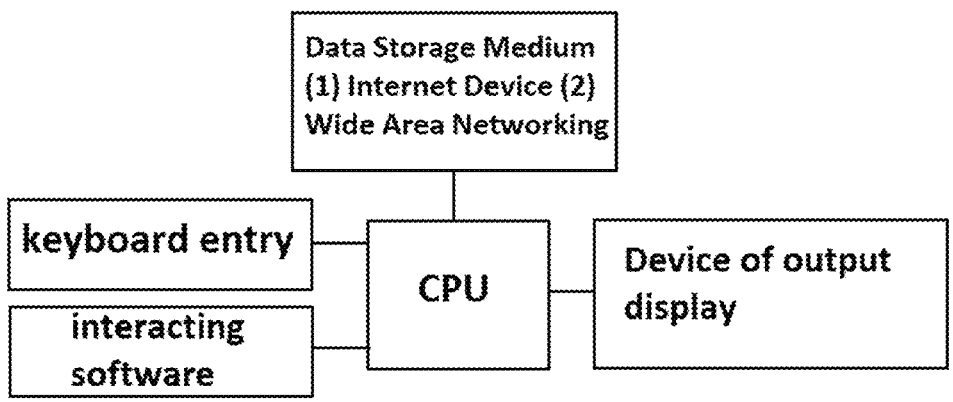
FIG. 19 is a block diagram showing the physical structure of a computer system device involved in the implementation of Digital Development Method.
Figure 20:
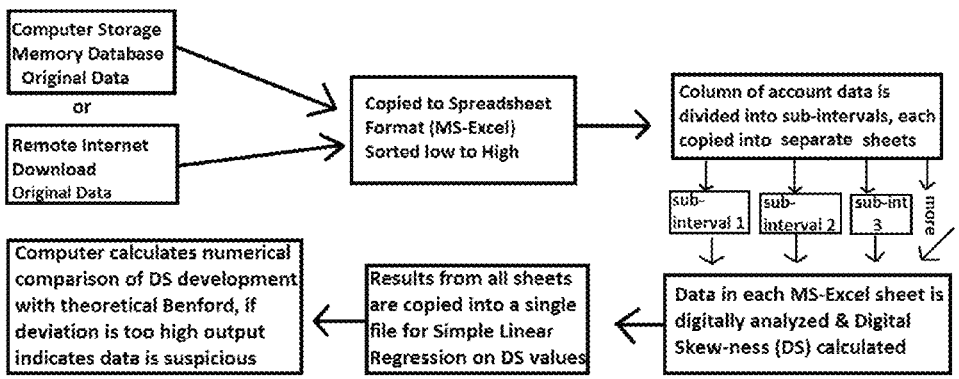
FIG. 20 is a flow chart of Digital Development Method depicting the dynamics of data transformation from original data, to sorting, to partitioning, to digital analysis, back to aggregation of DS results, to regression, and finally to computer output of data honesty status.

FIG. 18 depicts computer output of the histogram (crude density) of related LOG of this exponential 3% growth series, confirming the general conjecture made earlier that deterministic multiplicative processes follow a flat horizontal line, namely being uniformly distributed everywhere throughout the entire range.

What is claimed is:

1. A computer-processed method for detecting fraudulent data stored as a database on any physical computer comprising:

applying a computer-processing sorting-algorithm to the entire data from low to high and loading the resultant ordered data into a dedicated compartment within memory hardware;

partitioning by a processor the entire range of said resultant ordered data from said dedicated compartment into smaller sub-intervals effecting data analysis on said data based on at least one preselected template attribute via computer processes;

selecting by the processor each said sub-interval individually as a complete data set in order to be able to calculate in the next stage its unique digital arrangement and placing each sub-interval within a dedicated compartment in memory hardware;

determining by the processor mini leading digits distributions via a computer-based process of an algorithm which transforms and breaks down numbers into their constituent digits followed by a computerized process of the elimination of all the digits except the first one appearing on the left-most side of numbers for each of the said sub-intervals in each of the dedicated memory compartments;

comparing by the processor leading digits distributions of individual sub-intervals in their respective dedicated compartment within memory hardware to the Benford condition which is stored in a separate dedicated compartment within memory hardware via a computation of a singular numerical measure to be called 'DS' signifying degree of digital skew-ness and defined as the sum of six positive and negative ratios of [(observed % of digit d)−(theoretical Benford % of digit d)]/(theoretical Benford % of digit d) as d varies from 1 to 2 for positive ratios and from 6 to 9 for negative ratios;

comparing by the processor the overall rise in the series of all DS values as focus shifts from the lowest sub-interval on the left until the highest sub-interval on the right to the supposed theoretical overall rise in generic DS series along the entire range of data for the idealized honest data; and identifying by the processor a plurality of reported data types for suspicion of fraud if said observed overall rise of DS series residing within its dedicated memory compartment deviates too far from the supposed honest theoretical overall rise of DS series residing in its separate dedicated computer compartment.

2. The method of claim 1, wherein the partitioning partition of the entire range of data is being done along adjacent integral powers of ten values, such as ($10^{-3}$, $10^{-2}$], (0.01, 0.1], (0.1, 1], (1, 10], (10, 100], ($10^2$, $10^3$], and so forth.

3. The method of claim 2, wherein in order to fit the entire range of data into a sufficient and efficient set of such sub-intervals, the left-most sub-interval is between:
10^INTG(LOG(MIN)) and 10^(INTG(LOG(MIN))+1); and the right-most sub-interval between:
10^INTG(LOG(MAX)) and 10^(INTG(LOG(MAX))+1); wherein MAX and MIN signify the extremes values within the entire data set, and INTG(X) signifies a function yielding an integral value of any number X, discarding the fractional part, while leaving integers unaltered.

4. The method of claim 3, further comprising the step of excluding from further analysis the two extreme sub-intervals on the right and on the left as outliers (improper) whenever insufficient amount of data falls within them, with a fixed cutoff portion of one tenth of one percent (0.1%) of overall data per sub-interval, being the threshold below which exclusion is applied.

5. The method of claim 4, wherein the leading digits distributions are digital distribution is pertaining to the first leading digits, also known as first order significant digits.

6. The method of claim 5, further comprising the step of calculating a singular measure of 1st order over-Benford-ness to be stored in a dedicated memory location and to be called Digital Skew-ness or simply DS, indicating by how much 1st digital distribution of a given sub-interval is even more biased in favor of low digits as compared with the 1st digits Benford condition.

7. The method of claim 6, wherein the Digital Skew-ness (DS) to be stored in a dedicated memory location is being defined as the sum of: (i) the positive percentages of the deviations over and above the 1st order Benford condition for the lowest 2 digits, and (ii) the negative percentages of the deviation below the 1st order Benford condition for the highest 4 digits; namely:

$$DS=(A1-0.301)/0.301+(A2-0.176)/0.176+(0.067-A6)/0.067+(0.058-A7)/0.058+(0.051-A8)/0.051+(0.046-A9)/0.046$$

Ai being the actual proportion of numbers within the sub-interval having first digit i.

8. The method of claim 7, further comprising the performing a first honesty test by assigning a simple (integral) index value called IND to each sub-interval to be stored in a dedicated memory location; wherein number 1 is being assigned to the left-most sub-interval, 2 to the next adjacent sub-interval to the right, etc., with the last index value—called L for the last one, namely for the right-most proper sub-interval; therein L is being equal to the numbers of all relevant sub-intervals in the analysis; wherein DS series is conveniently treated as a Time Series; wherein Simple Linear Regression is applied, with DS series as the dependent variable, IND as the independent variable; where model is DS=m*IND+b; and wherein two conditions imposed on the two extreme points of the regression line must be satisfied in order to pass the first honesty test, namely: m*1+b<−5 AND m*L+b>+3; wherein compliance with these two conditions above signifies in general that regressed DS series starts out decisively negative, ends up definitely positively, and slope m is decisively positive as well, thus meaning that DS series are rising overall along the range.

9. The method of claim 8, further comprising the performing a second honesty test by summing absolute values of individual DS values over all relevant sub-intervals, namely: |DS−1st|+|DS−2nd|+|DS−3rd|+etc. standing for the 1st, 2nd, and 3rd sub-intervals, etc.; wherein a minimum required value of this summation is set to a predetermined threshold level of 18, being the cutoff point below which data does not pass the second test.

10. The method of claim 4, wherein digital distribution is the leading digits distributions are pertaining to the second leading digits, also known as second order significant digits.

11. The method of claim 10, wherein the data set is sufficiently large having at least 10,000 values and thus at or above the threshold point.

12. The method of claim 11, further comprising the step of calculating a singular measure of 2nd-order-over-Benford-ness to be called Digital-Skew-ness-2 or DS2, indicating by how much the 2nd digital distribution of a given sub-interval is even more biased in favor of low digits as compared with the 2nd order Benford condition.

13. The method of claim 12, wherein the 2nd-order-Digital Skew-ness (DS2) is being defined as the sum of: (i) the positive percentages of the deviations over and above the 2nd order Benford condition for the lowest 3 digits, and (ii) the negative percentages of the deviation below the 2nd order Benford condition for the highest 3 digits; namely:

$$DS2=(A0-0.120)/0.120+(A1-0.114)/0.114+(A2-0.109)/0.109+(0.090-A7)/0.090+(0.088-A8)/0.088+(0.085-A9)/0.085$$

Ai being the actual proportion of numbers within the sub-interval having second digit i.

14. The method of claim 13, further comprising performing a third honesty test by assigning a simple integral index value called IND to each sub-interval; wherein number 1 is being assigned to the left-most sub-interval, 2 to the next adjacent sub-interval to the right, etc., with the last index value—called L—for the last one, namely for the right-most proper sub-interval; therein L is being equal to the numbers of all relevant sub-intervals in the analysis; wherein DS2 series is conveniently treated as a Time Series; wherein Simple Linear Regression is applied, with DS2 series as the dependent variable, IND as the independent variable; where model is DS2=m*IND+b; and wherein two conditions imposed on the two extreme points of the regression line must be satisfied in order to pass the third honesty test, namely: m*1+b<−1.5 AND m*L+b>+1.0; wherein compliance with these two conditions above signifies in general that regressed DS2 series starts out decisively negative, ends up definitely positively, and slope m is decisively positive as well, and thus that DS2 series are rising overall along the range.

15. The method of claim 14, further comprising performing a forth honesty test by the summation of the absolute value of individual DS2 values over all sub-intervals, namely |DS2−1st|+|DS2−2nd|+|DS2−3rd|+etc. standing for the 1st, 2nd, and 3rd sub-intervals, etc.; wherein a minimum required value of this summation is set to a predetermined threshold level of 4 to be stored in a dedicated memory location, being the cutoff point below which data does not pass the forth test.

16. The method of claim 15 methods of claims 8, 9, 14, and 15, further comprising the identifying of reported data as suspicious if one or more of the four tests above fails; finding any such test failure prompts a rejecting the null hypothesis claiming that data resembles an honest random and statistical process with its typical pattern of gradual increase in skew-ness of digital distributions towards favoring low digits over high ones as focus shifts from low values on the left to high values on the right; wherein even a single failure throw into doubt the assumption that data comes with an approximate digital equality on the left, the Benford condition around the center, and extreme digital inequality favoring low digits on the far right.

* * * * *